(12) United States Patent
Nishida et al.

(10) Patent No.: US 6,746,720 B2
(45) Date of Patent: Jun. 8, 2004

(54) CONVEYANCE APPARATUS AND CONVEYANCE METHOD

(75) Inventors: Hidenobu Nishida, Kumamoto (JP); Makoto Sakai, Kumamoto (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 238 days.

(21) Appl. No.: 09/753,579

(22) Filed: Jan. 4, 2001

(65) Prior Publication Data

US 2001/0050046 A1 Dec. 13, 2001

(30) Foreign Application Priority Data

| Jan. 14, 2000 | (JP) | ................................ 2000-007055 |
| Jan. 18, 2000 | (JP) | ................................ 2000-009131 |
| Jan. 18, 2000 | (JP) | ................................ 2000-009241 |

(51) Int. Cl.⁷ ................................. B05D 1/18
(52) U.S. Cl. .................. 427/430.1; 427/402; 118/423; 118/66; 204/198; 204/202
(58) Field of Search ............. 198/346.3, 474.1, 198/370.04, 600, 470.1; 204/198, 214, 202, 199, 225; 118/423, 56, 57, 72–74, 66, 58; 427/430.1, 372.2, 402, 299, 346, 347

(56) References Cited

U.S. PATENT DOCUMENTS

| 3,034,665 | A | * | 5/1962 | Speaker |
| 3,158,249 | A | * | 11/1964 | Harper et al. |
| 3,510,014 | A | * | 5/1970 | Speaker et al. |
| 3,648,821 | A | | 3/1972 | Rudolph et al. |
| 3,673,984 | A | * | 7/1972 | Coulombe |
| 4,331,230 | A | * | 5/1982 | Buckley |
| 4,651,671 | A | * | 3/1987 | Pedersen |
| 4,765,270 | A | | 8/1988 | Faber |
| 4,874,639 | A | * | 10/1989 | Matsui et al. |
| 5,110,440 | A | * | 5/1992 | Case |
| 5,725,669 | A | * | 3/1998 | Heckmann |
| 6,355,104 | B1 | * | 3/2002 | Polster |

FOREIGN PATENT DOCUMENTS

| JP | 2-111481 A | 4/1990 |
| JP | 211148 1 | 4/1990 |
| JP | 610492 0 | 12/1994 |
| JP | 6-104920 B2 | 12/1994 |

* cited by examiner

*Primary Examiner*—Brenda A Lamb
(74) *Attorney, Agent, or Firm*—Birch, Stewart, Kolasch & Birch, LLP

(57) ABSTRACT

A plurality of baths for dipping and the like is arranged in series so that these baths contact one another, and a conveyor 2 is linearly arranged above the dipping bath in one plane. A workpiece 1 is tact-conveyed on the conveyor 2 in a floor conveyor position. The workpiece 1 is stopped at each bath for dipping and the like, wherein when the workpiece 1 is rotated horizontally about 180° to change its position to an overhead conveyor position, it is immersed in the corresponding bath for dipping and the like for dipping treatment.

15 Claims, 19 Drawing Sheets

Fig. 17
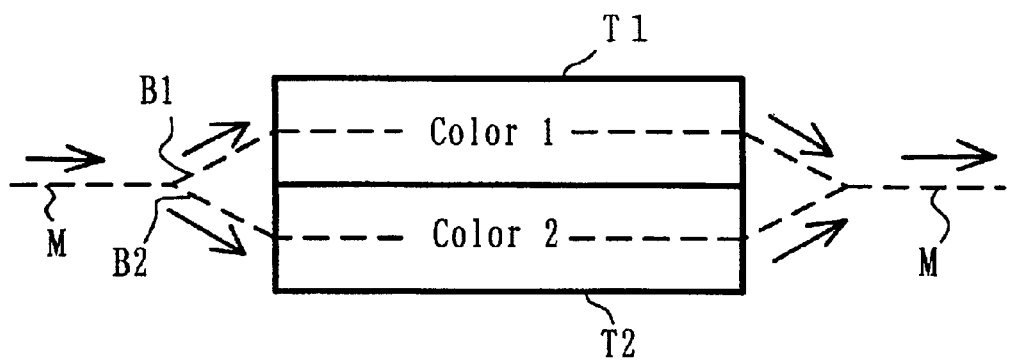
A
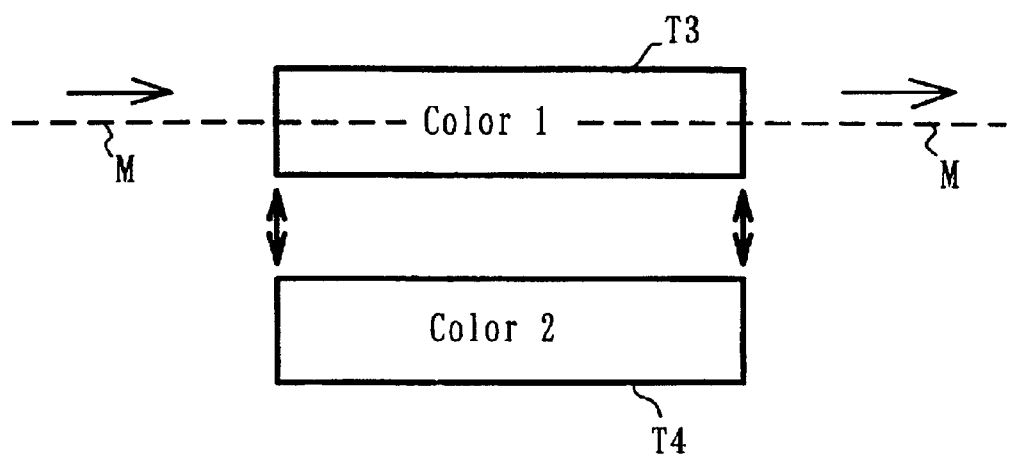
B
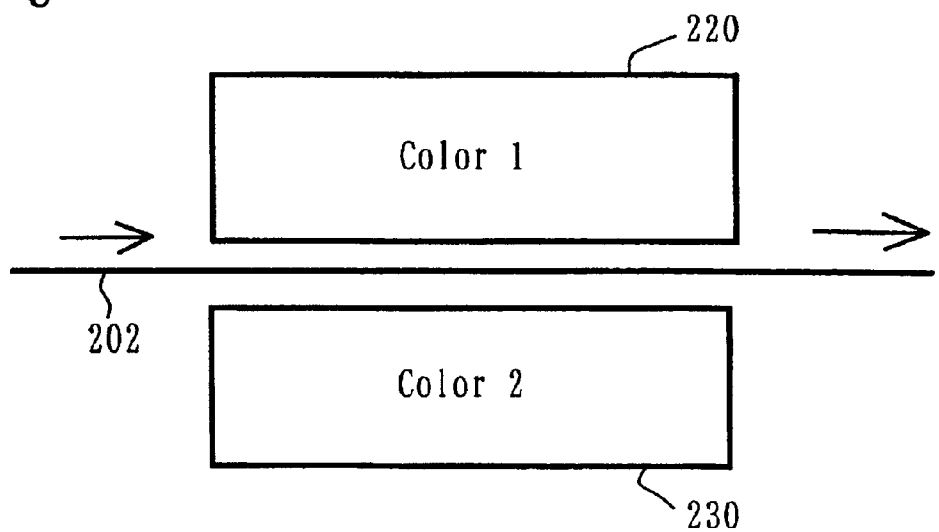
C

CONVEYANCE APPARATUS AND CONVEYANCE METHOD

BACKGROUND OF THE INVENTION

1. Field of the Invention

The present invention relates to a conveyance apparatus which causes a workpiece which is supported by a conveyor to pass through a plurality of treating processes while changing the workpiece position, and more particularly to a conveyance apparatus which is suitable for a surface treatment line such as a car body painting line in a vehicle manufacturing factory.

Also, the present invention relates to a conveyance apparatus which is preferably used in a line in which different kinds of workpieces, made of materials such as resin, metal or the like, requiring different treating conditions, are mixed.

Further, the present invention relates to a conveyance apparatus for multi-color painting. In the present invention, a floor conveyor position is defined as a workpiece position in which a workpiece is secured to a platform and is supported by resting on the conveyor, and an overhead conveyor position is defined as a workpiece position in which a workpiece is supported by hanging. In addition, a side conveyor position is a workpiece position in which a workpiece is supported approximately horizontally to a side direction of a conveyor. Also, horizontal rotation means rotation in a plane vertically intersecting the direction of travel.

2. Description of the Prior Art

In a painting line for a vehicle, there are many treating processes such as pretreatment, electrodeposition, washing, painting, and drying. A workpiece is transferred among these treating processes by a conveyor. When painting a comparatively large body of, for example, a four-wheel vehicle by dipping is required, as shown in FIG. 11A, a workpiece W which has been transferred along a floor conveyor FC located on a floor is then transferred to and suspended from an overhead conveyor HC which is arranged to move vertically relative to a painting line. In such a condition, the workpiece W is caused to pass above pretreatment and electrodeposition baths and the like, while the conveyor itself is arranged to move vertically relative to the pretreatment and electrodeposition baths and the like. In this manner, the workpiece W is moved vertically to undergo dipping treatment and then transferred again to the floor conveyor FC.

Also, in the case of electrodeposition, to obtain fine painting quality, it is known that the workpiece must be rotated in an electrodeposition paint bath to change its position to a successive variety of positions (e.g. see Japanese Patent Publication No. Hei 6-104920 and Japanese Unexamined Patent Publication No. Hei 2-111481). Japanese Patent Publication No. Hei 6-104920 also discloses that the body undergoes electrodeposition by dipping. This method is a so-called batch type processing, in which an elevator mechanism for moving the body vertically relative to a dipping treatment bath, and a rotational mechanism for rotating the body immerged in a solution are provided. Dipping is performed by a double action of an upward and downward movement and subsequent rotation.

On the other hand, when painting a comparatively small body of a two-wheel vehicle is required, as shown in FIG. 11B, all the painting processes can be performed using the overhead conveyor HC. Accordingly, it is no longer necessary to transfer the body to other positions while being painted as with the four-wheeled vehicle, but the dipping treatment still requires the vertical operation in the same manner as shown above.

In a process wherein the workpiece position must be changed to the floor conveyor position and the overhead conveyor position, if the workpiece must be transferred whenever the workpiece position is changed while being conveyed, loss of time is caused. It is therefore desired to avoid transfer of the workpiece while it is being conveyed at least in one continuous process even though the workpiece position changes. Further, in a method such as a dipping treatment of the prior art wherein a conveyance line is continuously changed vertically, the proportion of time unusable for dipping but required only for immersing the workpiece in and removing it from a bath becomes large relative to the substantial dipping time of the workpiece. Accordingly, it is desired to reduce this loss of time. Also, in the case of the overhead conveyor, there is some possibility that the painting quality deteriorates if dust and the like falling from the overhead conveyor adhere to the workpiece. It is therefore desired to realize a conveyance method that makes it difficult for such falling substances to adhere to the workpiece. It is therefore a first object of the present invention to solve the above-mentioned disadvantages.

In a painting line in which processes are carried out in the order of a pretreatment process, painting process and drying process, the treating conditions in the pretreatment process and the drying process differ according to whether the workpiece is made of resin or of metal. For this reason, the treatments have been performed by providing an exclusive line for resin workpieces and another for metal workpieces, or switching one line depending on the material handled.

In the case of providing an exclusive line relative to the above mentioned different kinds of materials, since the amount of equipment required doubles the installation space and investment could increase. In the case of switching the line depending on the material, a loss occurs because a lot of time for switching is spent for washing the apparatus (pretreatment process), control of temperature (drying process) or the like after switching. Moreover, this loss may become larger, and in order to reduce it, it is necessary to produce the workpieces in lots. However, if produced in lots, it is impossible to produce in synchronization with another department. It is a second object of the present invention to solve such disadvantages.

In electrodeposition painting of a body of vehicle, a conveyor is generally disposed above a painting bath, and a workpiece hung from and moved by the conveyor is lowered into the painting bath and is dip-treated therein (for example, see Japanese Patent Publication No. Hei 6-104920). Also, in the case where a plurality of different colors are painted by using such a painting line, methods shown in A and B of FIG. 2 are utilized.

In the method A, separate painting baths T1, T2 for two different colors (color 1 and color 2) are arranged side by side, and diverging conveyor lines B1, B2 are arranged above the painting bath, each of the diverging lines B1, B2 being connected with a main line M before and after the painting baths. A workpiece is diverted to either of the diverging lines B1 or B2 according to the required color (either the color 1 or the color 2) and is dipped into the corresponding painting bath T1 or T2. Hereinafter, this is referred to as a diverging method. The method B is so designed that the main line M of the conveyor is arranged above a single painting bath T3, and the painting bath T3 and T4 are exchanged whenever the color is to be changed to either the color 1 or the color 2. Hereinafter, this is referred to as a color replacement method.

In the above-mentioned diverging method, because the main line M is separated into the diverging lines B1, B2, the total length of the conveyance line is increased. This causes an increase in both equipment costs and installation space. In the color replacement method, much time is required to replace the painting baths and the efficiency is reduced. Accordingly, to solve such disadvantages, it is a third object of the present invention to provide a conveyance apparatus for performing selectively painting of two different colors without increasing the length of the line and replacing the painting bath.

SUMMARY OF THE INVENTION

To solve the above-noted disadvantages, a first invention provides a dipping treatment apparatus having a conveyor disposed above a treatment bath for dipping and the like and designed to cause a workpiece which is conveyed by the conveyor to be immersed in and to emerge from the treatment bath for dipping and the like, wherein the workpiece is supported above the conveyor by a carrier, and the carrier is swung above the treatment bath for dipping and the like in a plane at right angles to the direction of travel to cause the workpiece to be immersed in and emerge from the treatment bath for dipping and the like.

According to the first invention, a workpiece is conveyed in a floor conveyor position in which it is supported on a conveyor disposed above a treatment bath for dipping and the like. When the workpiece is horizontally rotated about 180° above the treatment bath for dipping and the like, it is immersed in the treatment bath and the like. When the workpiece is further rotated about 180°, it emerges from the treatment bath for dipping and the like to return to its original floor conveyor position. Accordingly, the workpiece undergoes the dipping treatment while being rotated horizontally. Also, the dipping treatment is performed by rotating the workpiece horizontally without moving the conveyor vertically as seen in the prior art. It is therefore possible to remarkably reduce the loss of time not related to dipping, but required only for causing the workpiece to be immersed in and to emerge from the bath. As a result, the dipping treatment can be performed efficiently.

At this time, a part of the conveyor which is positioned above the treatment bath for dipping and the like may be provided with a movable section which rotates in a plane at right angles to the direction of travel, and this movable section is caused to rotate together with the carrier.

Since a part of the conveyor is arranged to rotate horizontally as a moveable section, it is possible to strengthen the moveable section and simplify the construction comparatively. Further, a rotational means for actuating the movable section can be easily housed in a hollow section of the conveyor.

Also, the conveyor positioned above the treatment bath for dipping and the like may be disposed in one level plane.

Since the conveyor is linearly arranged in the same level plane without moving it vertically, the equipment can be simplified for easy maintenance, and equipment space can also be saved.

Further, more than one treatment bath for dipping and the like may be disposed in series, and a dipping treatment is performed for each treatment bath for dipping and the like in sequence.

If there is a plurality of treatment baths for dipping and the like, these baths are arranged in series and the workpiece is rotated horizontally above each of them. Thus, the workpiece can undergo the dipping treatment for each treatment bath for dipping and the like in sequence and as a result, the distance between each treatment bath for dipping and the like can be shortened to provide compact equipment.

Furthermore, a tact conveyance method may be employed whereby the dipping treatment is performed after the carrier is stopped above the treatment bath for dipping and the like.

The tact conveyance method is employed to convey the workpiece and the dipping treatment can be performed after the carrier is stopped above the treatment bath for dipping and the like. Accordingly, the length of the treatment bath for dipping and the like can be further shortened. In the case where a plurality of treatment baths for dipping and the like is provided, such short treatment baths for dipping and the like can be positioned adjacently to provide compact dipping treatment equipment.

In a second invention of the present application, a conveyance apparatus for conveying different kinds of workpieces in a mixed condition to treating sections is provided, wherein the apparatus is provided with a corresponding exclusive treating section on each side of a conveyor for each different kind of workpiece, the workpiece on the conveyor can be horizontally rotated selectively either to the right or left side in the direction of travel of the conveyor corresponding to the treating section, and the apparatus is constituted to treat each workpiece in accordance with the treating conditions.

Since exclusive treating sections are provided relative to different kinds of workpieces on each side of the conveyor, the workpiece on the conveyor is swung to either the right or left side according to the treating conditions, and an appropriate treatment can be performed at a treatment section suitable for this workpiece. For this reason, since it is unnecessary to provide exclusive lines for workpieces differing in required treatment conditions, depending on the material or the like, which can be produced in a common line, it is possible to save installation space and investment. Also, since it is not necessary to provide a line to be switched to produce each different kind of workpiece and it is possible to continuously transfer the different kinds of workpieces, no switching loss occurs, and since production by lots is not necessary, the production in this department can be synchronized with productions another department.

At this time, said treatment may be a pretreatment process preceding a painting process in a painting line.

In the case of a pretreatment process in a painting line, the treatment differs depending on whether the workpiece is resin or metal, but even in this case, it is possible to transfer workpieces of different materials in a mixed condition, and thereafter, since painting can be performed in a common line, the painting line can be compact.

Also, said treatment may be a drying process subsequent to a painting process in a painting line.

In a drying process subsequent to painting, also, the drying temperature differs for resin workpieces and metal workpieces. However, since the resin or the metal workpieces which have different treating temperatures can be transferred in a mixed condition, a single line can be utilized after painting, so that it is possible to have a simple painting line.

Further, said treating section comprises dipping baths, and the adjoining baths may be arranged at different heights.

In the case where the dipping treatment is performed by providing two dipping baths as an exclusive treatment section, since adjoining dipping baths have been arranged differently by height, the treatment section applied after the dipping treatment can essentially be prevented from mixing into the adjoining dipping bath.

Furthermore, in a conveyance apparatus for conveying different kinds of workpieces in a mixed condition to treating sections, said apparatus may be provided with a corresponding exclusive treating section on each side of a conveyor for each different kind of workpiece, and the apparatus is adapted to allow the workpiece on the conveyor to be horizontally rotated selectively to the right or left side in the direction of travel, corresponding to the treating conditions so as to treat the workpiece at any of the right and left exclusive treating sections or to pass the workpiece without rotating horizontally in the case where the treating condition is not suitable for any of these exclusive treating sections.

In addition to selection of right and left treating sections, a workpiece for which the treating conditions in either the right or left exclusive treating section are not suitable is allowed to pass by canceling the treatment. Therefore, the three kinds of workpieces can be handled, that is, two kinds corresponding to the right and left exclusive treating sections and one kind other than these, and it is possible to increase the number of kinds of different workpieces which can be treated simultaneously.

In a third invention, the apparatus is provided with painting sections for applying different colors at both the left and right sides of a single conveyor, and a workpiece which is guided and moved by said conveyor is allowed to rotate horizontally either to the right or left side and is painted with a required color in any one of said painting sections. At this time, it is possible to perform the painting as electrodeposition, and to provide the painting section as a dip painting bath. Further, the painting section in the present invention is a painting bath in the dipping treatment, such as the electrodeposition or the like, and can be a booth in either a spray method or a brushing method.

According to the present invention, when the workpiece being carried and guided by the conveyor reaches the painting section, the workpiece rotates horizontally in either the left or right direction and enters any of the painting sections which are arranged with the conveyor positioned therebetween and which utlilize different colors for painting, whereby the workpiece is painted with the required color in that painting section. Accordingly, painting with a different color can be performed selectively according to the direction of horizontal rotation of the workpiece. In this manner, the conveyor can be common even if the different colors are used, and since the apparatus does not require an exclusive diverging line, both the installation cost and the investment can be reduced. Also, since it is not necessary to replace the color (to replace the bath) and it is possible to transfer the workpiece continuously, the painting efficiency is outstandingly improved.

Also, if the painting method is electrodeposition, dipping baths containing different colors are provided at the left and right sides of the conveyor, and the workpiece transported to this portion of the painting bath is rotated horizontally to swing to either the left or the right. Therefore, multi-color painting can be performed efficiently by using electrodeposition.

BRIEF DESCRIPTION OF THE DRAWINGS

The above and other objects, features and advantages of the present invention will become more apparent from description when taken in conjunction with the accompanying drawings.

FIG. 5 is a view similar to FIG. 4 in an overhead conveyor position and the like;

FIG. 17 is a schematic diagram showing a painting line applied to each embodiment;

DETAILED DESCRIPTION OF THE PREFERRED EMBODIMENTS

Figure 1:
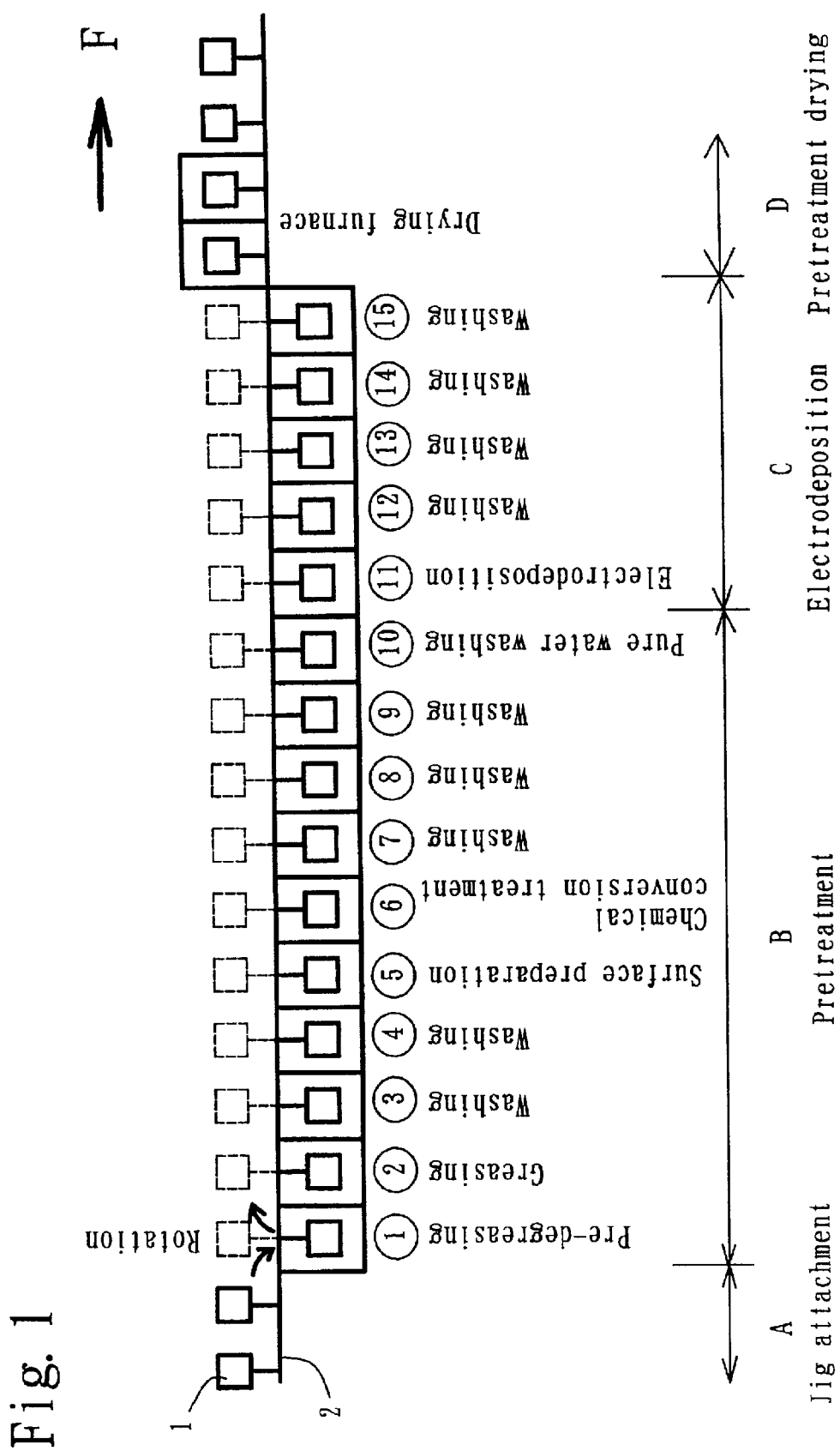
FIG. 1 is a dipping treatment flow chart according to an embodiment.

First embodiments that have been applied to a painting line for a motorcycle will be described with reference to the accompanying drawings. FIG. 1 shows a dipping treatment according to the present embodiment, in which a jig attachment A, pretreatment B and electrodeposition painting C are carried out. Subsequently, pretreatment drying D, and, although not shown in the figure, finish coating and finish coating drying are carried out.

In the pretreatment B for performing the dipping treatment, each process of pre-degreasing (1), degreasing (2), washing (3), (4), surface preparation (5), chemical conversion treatment (6), washing (7), (8), (9), and pure water washing (10) is performed in sequence. The treatment baths for dipping and the like which are used for the dipping treatment are provided in response to each process which corresponds to a circled operation number in the figure. (The operation number in the description is indicated by corresponding parenthesized numbers. Identical indication thereafter.) The dipping baths are arranged in series to be adjacent to one another and the length of each bath in the direction of travel F is minimized so that it is slightly longer than the longitudinal dimension of the workpiece 1. In the subsequent treatment of electrodeposition C, each process of electrodeposition (11) and washing (12)~(15) is performed.

A conveyor 2 is linearly arranged (i.e. without vertical arrangement) in one level plane above the treatment bath for dipping and the like. The workpiece 1 is stopped above each bath for dipping and the like for dipping treatment, which is a so-called TACT conveyance.

The workpiece 1 is rotated horizontally relative to the conveyor 2 in a method described later and moves between a floor conveyor position (see operation numbers (1)~(15) shown by a broken line) in which the workpiece 1 is supported above the conveyor 2 and an overhead conveyor position (shown by a solid line) in which the workpiece 1 is rotated a further 180° from the floor conveyor position to be supported below the conveyor 2 while being suspended.

With this arrangement, even though the conveyor 2 is maintained in a level plane, the dipping treatment can be performed only by rotating the workpiece 1 horizontally for each treatment bath for dipping and the like. It is therefore possible to remarkably reduce the loss of time not spent for dipping but required only for causing the workpiece 1 to be immersed in and to emerge from the treatment bath, and as a result, dipping treatment can be efficiently performed.

Since the workpiece 1 is designed to rotate horizontally, it is sufficeient if the length of the treatment bath for dipping and the like in the direction of travel F is slightly longer than that of the workpiece 1 in the longitudinal direction, and the length can be further shortened. Since the shape of the conveyor 2 can be simplified, maintenance is easier and a larger installation space is not necessary.

Since the tact conveyance method is adopted here, the dipping treatment can be performed by stopping the carrier at each treatment bath for dipping and the like. As a result, a plurality of treatment baths for dipping and the like can be positioned in series, adjacent to one another, and it is possible to provide a remarkably compact dipping treatment apparatus.

Figure 2:
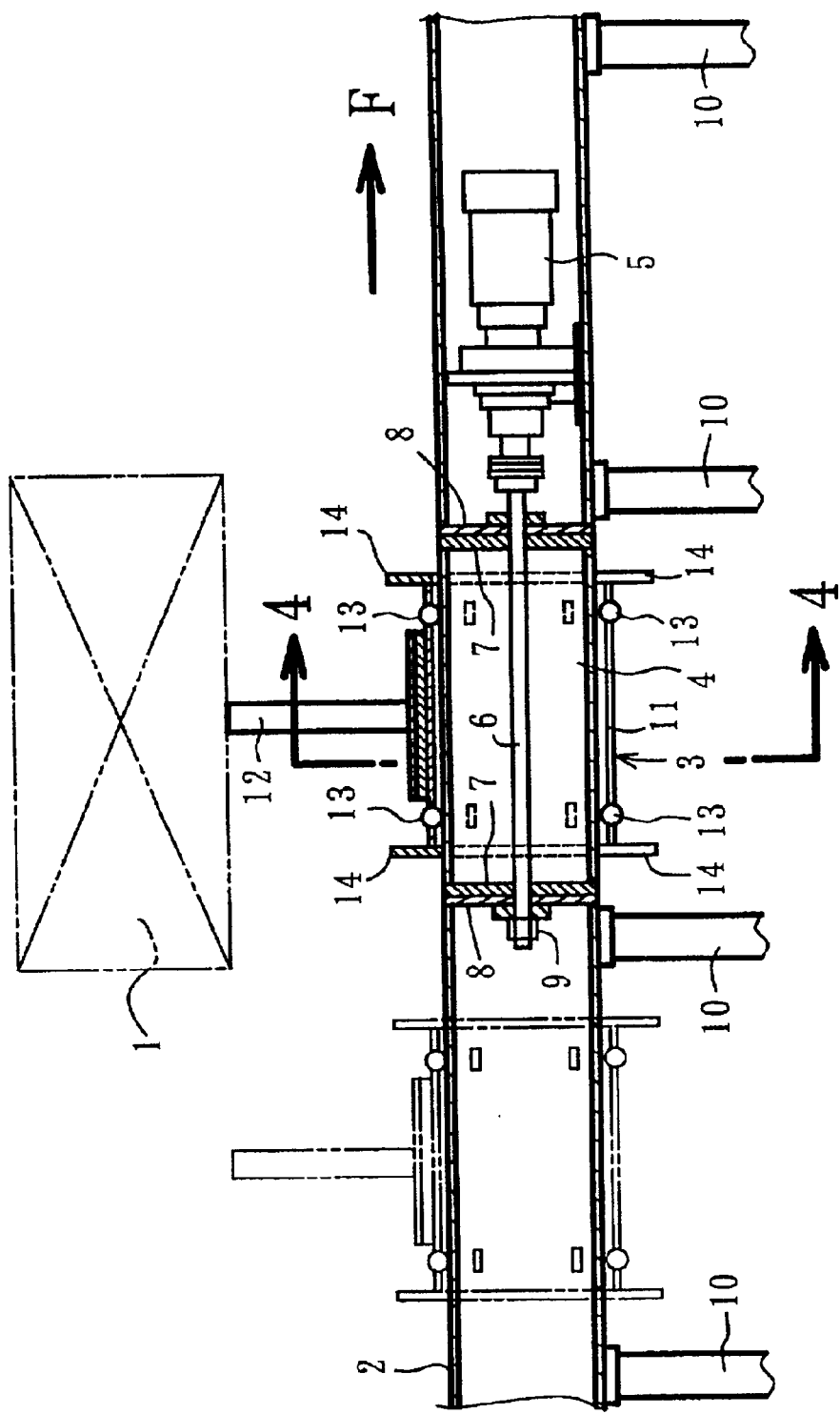
FIG. 2 is a side view of basic parts in a floor conveyor position according to a first embodiment.
Figure 3:
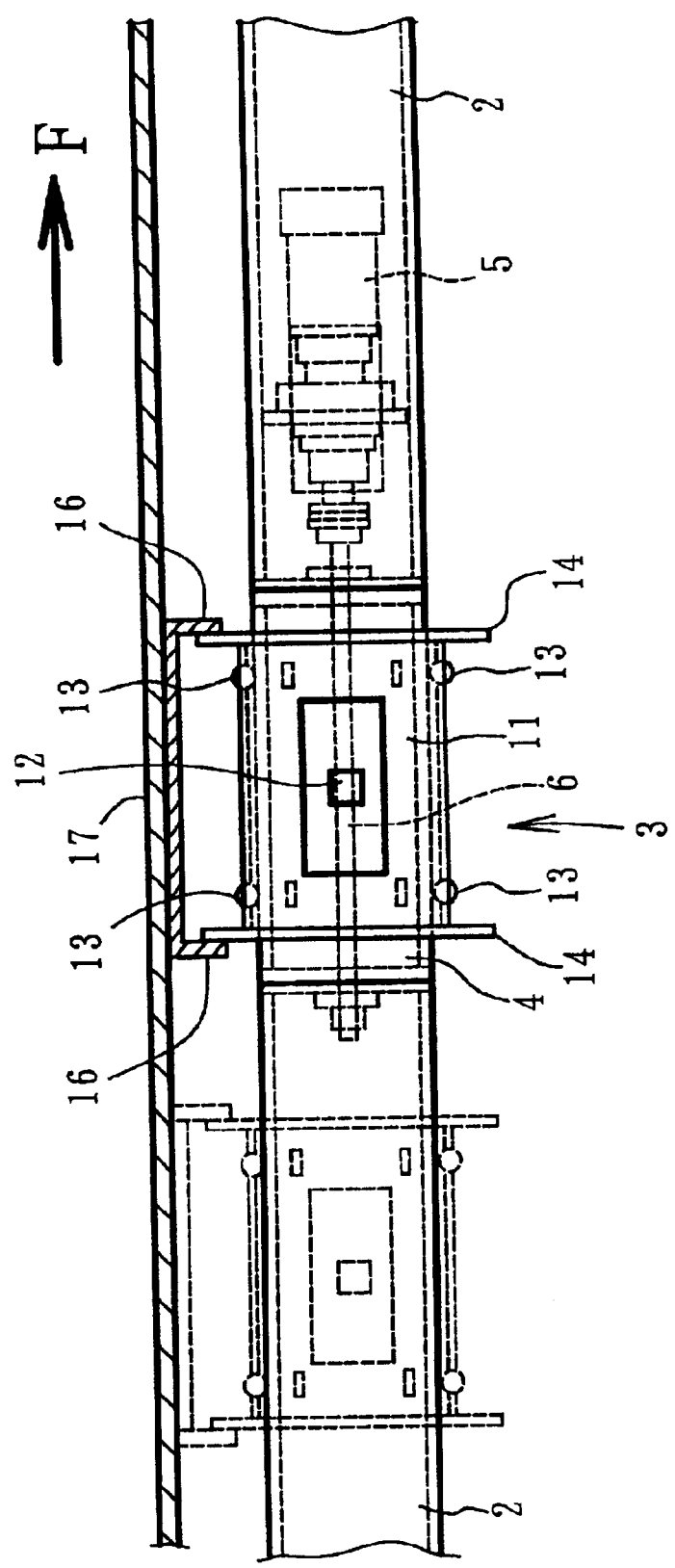
FIG. 3 is plan view thereof.
Figure 4:
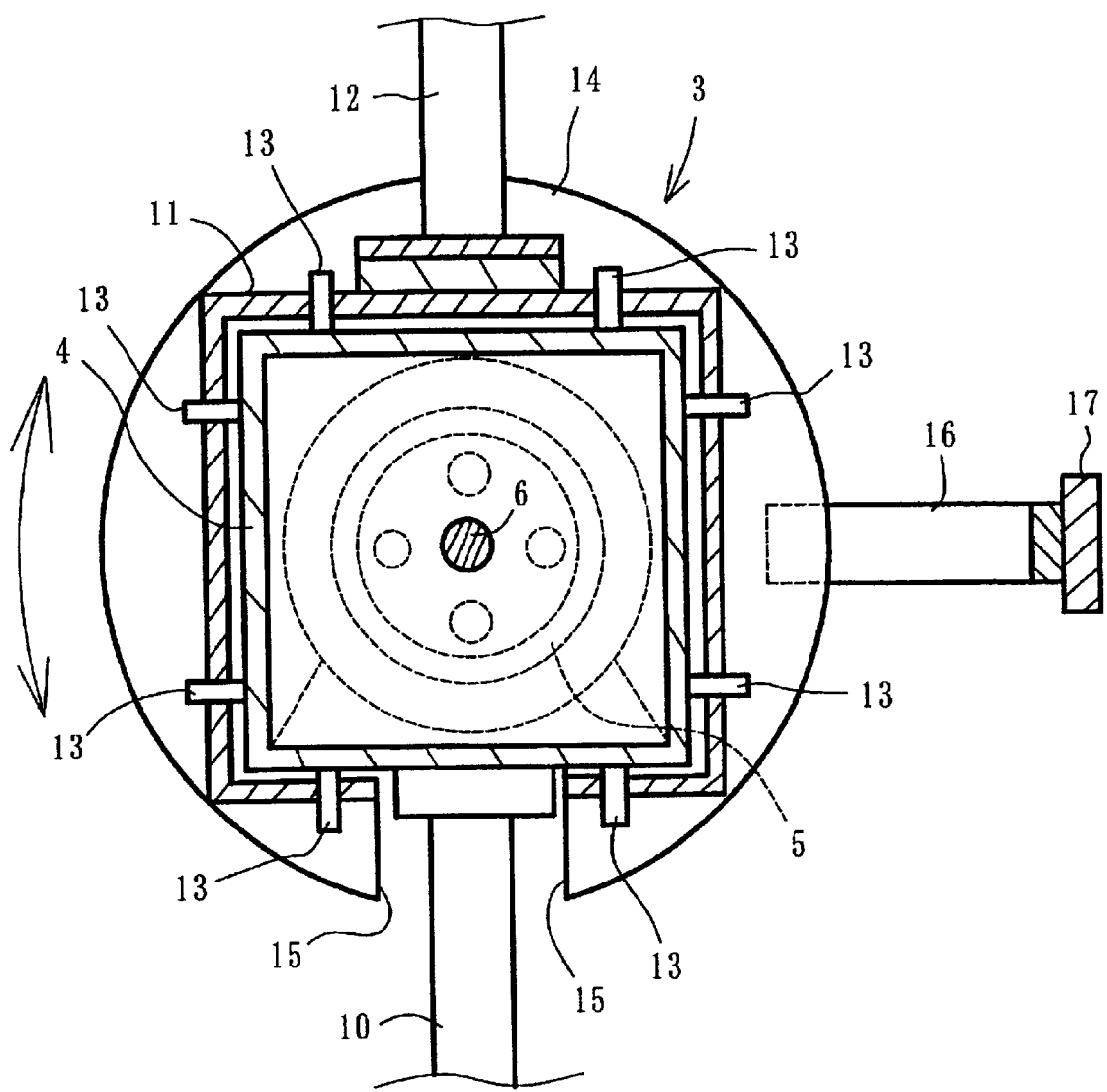
FIG. 4 is a cross sectional view taken along the line 4—4 of FIG. 2.
Figure 5:
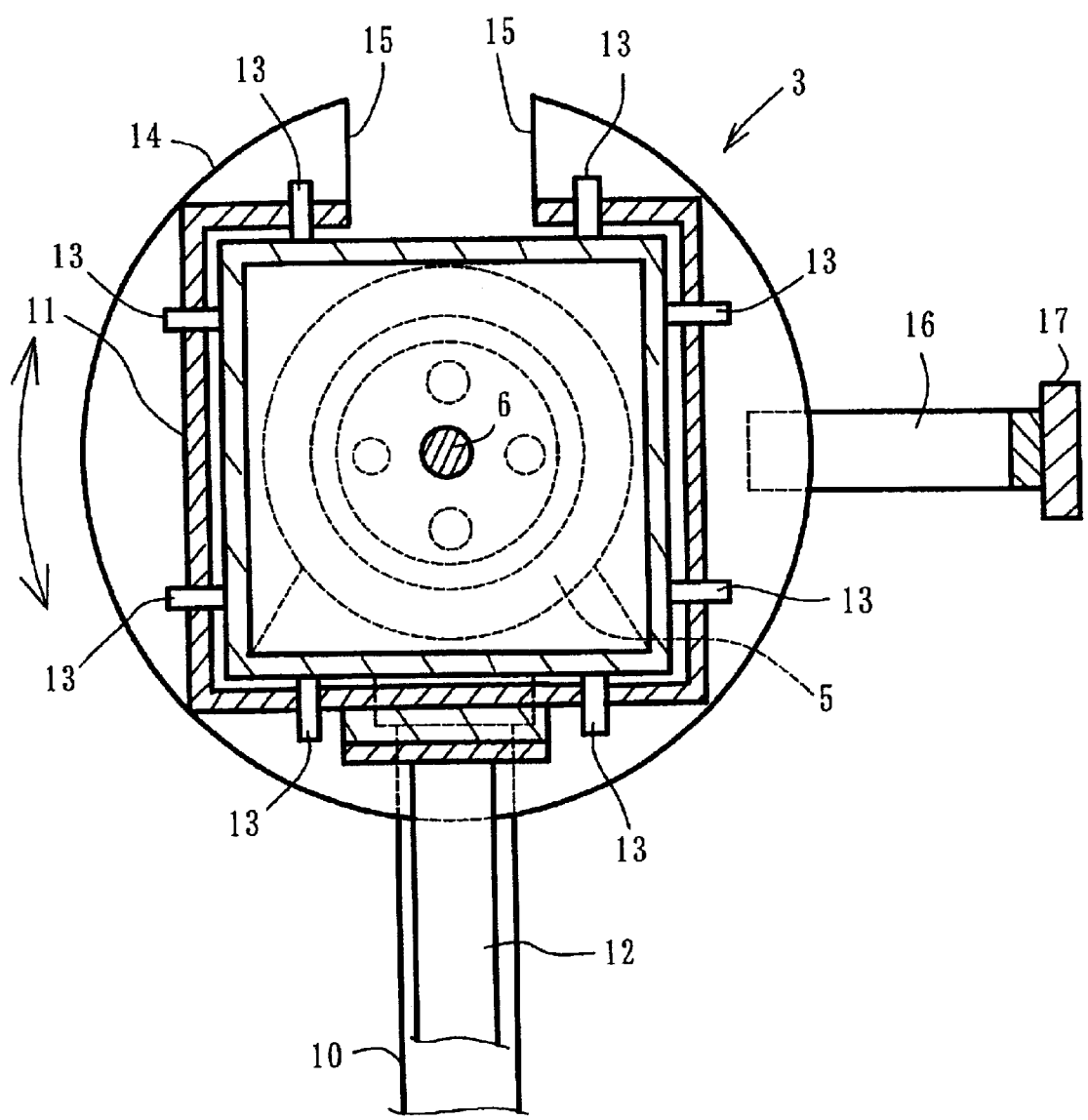

FIG. 2 is a side view showing the conveyor 2 partially cut away and FIG. 3 is a plan view thereof. FIG. 4 is a cross sectional view taken along the line 4—4 of FIG. 2 and FIG. 5 is a view similar to FIG. 4 showing a rotating condition of a part of the conveyor 2.

In these figures, the conveyor 2 is a hollow member of a substantially square cross section. A part of the conveyor 2 is provided with a separate moveable section 4 in a position corresponding to a process in which a workpiece must be changed from the floor conveyor position to the overhead conveyor position and the like.

The moveable section 4 has the same cross section as the front and rear sides of the conveyor 2 and is arranged to be horizontally rotatable in a plane at right angles to the direction of travel F. Namely, the moveable portion 4 is positioned between the front and rear sides of the conveyor 2, and a step motor 5 is fixedly secured to the inside of one side of the conveyor 2. A rotational shaft 6 of the step motor 5 is provided parallel to the center of the conveyor 2 and the moveable section 4 and arranged to penetrate vertical walls 7 provided before and after the moveable section 4. The vertical walls 7 are caused to integrally rotate with the rotational shaft 6. An end of the rotational shaft 6 is fixedly secured to a vertical wall 8 of the other side of the conveyor 2 by a nut 9.

With this construction, when the step motor 5 rotates a predetermined amount, the moveable section 4 integrally connected to the rotational shaft 6 rotates horizontally to an angle corresponding to the amount of rotation of the step motor 5. The bottom surface of the conveyor 2 is supported on the floor by support pillars 10 that are provided at fixed intervals in the longitudinal direction. The moveable section 4 is not provided with any support pillar 10 allowing it to be rotatable.

The carrier 3 is provided with a main body portion 11 with a square hole that is slightly larger than the conveyor 2 and the moveable section 4. The main body portion 11 is thus formed in a shape similar to the conveyor 2 and the movable section 4 to allow them to pass through. The carrier 3 can be guided on the conveyor 2 and the movable section 4 to move like a monorail in the direction of travel.

One end of a supporting rod 12 is integrally secured to the upper surface of the main body portion 11, while the other end thereof supports the workpiece 1. Rollers 13 are rotatably supported in a total of four places, front and back and right and left of each surface, and are arranged to roll on each surface of the conveyor 2 and the moveable section 4.

Circular plate-shaped flanges 14 are provided at the front and rear ends of the main body portion 11. A part of each flange 14 that becomes the lower part when in the floor conveyor position is formed with a cut out section 15 to avoid interference with the support pillars 10 during travel. The flanges 14 always engage a substantially C-shaped engaging member 16 and the engaging condition between them is maintained even though the carrier 3 rotates horizontally.

The engaging member 16 is fixedly secured to a belt-shaped carrier feeding member 17 which is arranged parallel to the conveyor 2. When the carrier feeding member 17 moves in the direction of travel F, the carrier 3, whether or not it horizontally rotates, is also moved by the engaging member 16 on the surface of either the conveyor 2 or the moveable section 4 in the direction of travel F.

Figure 6:
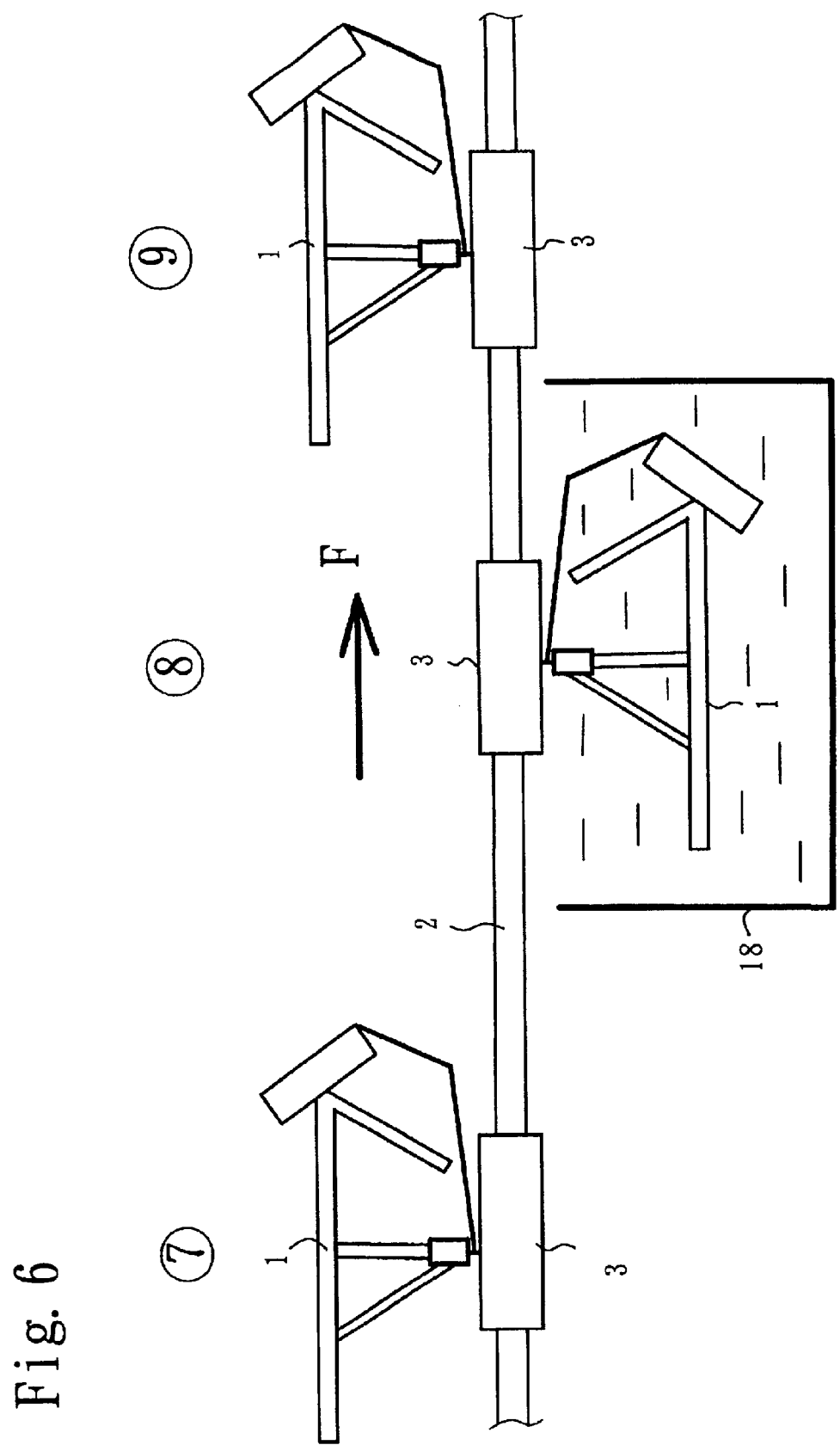
FIG. 6 is a view explaining the position control of a workpiece in an electrodeposition coating process.

An operation of the present embodiment will now be described. FIG. 6 shows the electrodeposition coating process C in which the carrier 3 moves on the conveyor 2 in the floor conveyor position. Once the carrier 3 reaches the moveable section 4 of the conveyor 2 provided above an electrodeposition paint bath 18, it stops moving. When the step motor 5 is then rotated 180°, the carrier 3 rotates horizontally 180° through the vertical walls 7 integrally provided with the rotational shaft 6.

Thus, the workpiece 1 rotates horizontally to the overhead conveyor position and is then immersed in the electrodeposition paint bath 18. After paint adheres to the workpiece 1 in the dipping process, the workpiece 1 is further rotated 180° to emerge from the electrodeposition paint bath 18 and returns to its original floor conveyor position. In this case, by setting the step motor 5, it is possible to either allow the workpiece 1 to continuously rotate horizontally or to allow it to rotate intermittently within the electrodeposition paint bath 18. As a result, satisfactory electrodeposition coating can be realized by allowing the workpiece 1 to move within the electrodeposition paint bath 18.

Since the conveyor 2 does not change its position vertically, but it is linearly maintained, it is possible to immediately start the dipping treatment. As a result, the loss of time not related to dipping but required only for allowing the workpiece 1 to be immersed in and removed from the electrodeposition paint bath 18 can be remarkably reduced, and the total painting time can also be reduced.

Since a part of the conveyor 2 itself is provided with the moveable section 4, it is possible to strengthen the moveable section 4 and simplify its construction comparatively. Also, the rotational means can be easily provided by the step motor 5. The step motor 5 can be easily housed in the hollow section of the conveyor 2, whereby the rotational direction and angle thereof can be freely controlled.

Since the carrier 3 is supported on the conveyor 2 like a monorail, the supporting construction for the carrier 3 can be simplified and strengthened and as a result, the conveyance of the workpiece 1 can be stabilized. It is especially suitable when a heavy workpiece 1 is supported.

Further, the carrier 3 is provided with flanges 14 that engage the engaging member 16 of the carrier-feeding member 17 provided parallel to the conveyor 2. Even though the carrier 3 rotates, engagement of the flanges 14 with the engaging member 16 can be always maintained to allow the carrier 3 to move. It is therefore suitable for a mechanism capable of moving the carrier 3 irrespective of the rotational position of the carrier 3.

Figure 7:
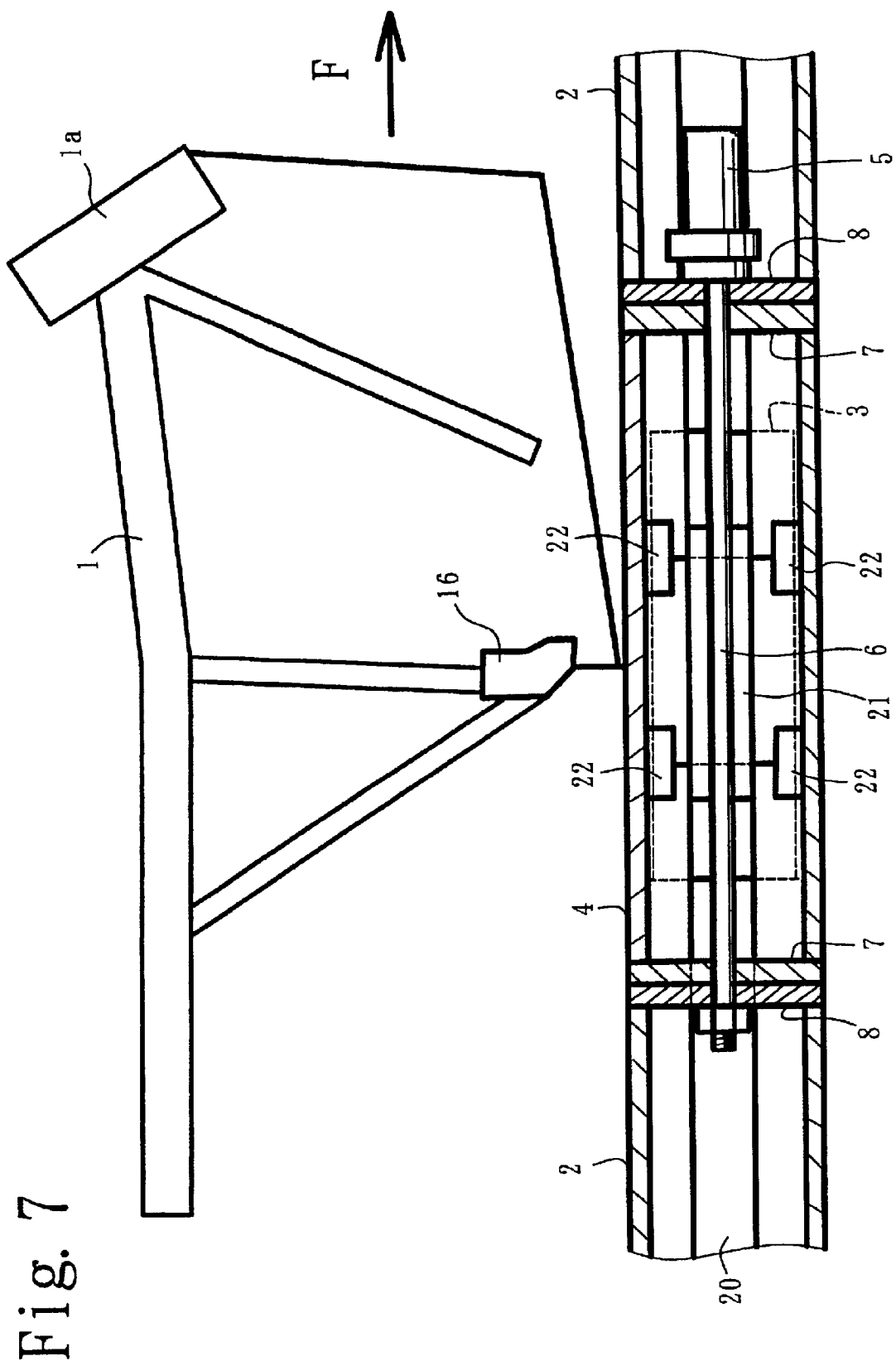
FIG. 7 is a side view of basic parts in a floor conveyor position according to a second embodiment.
Figure 8:
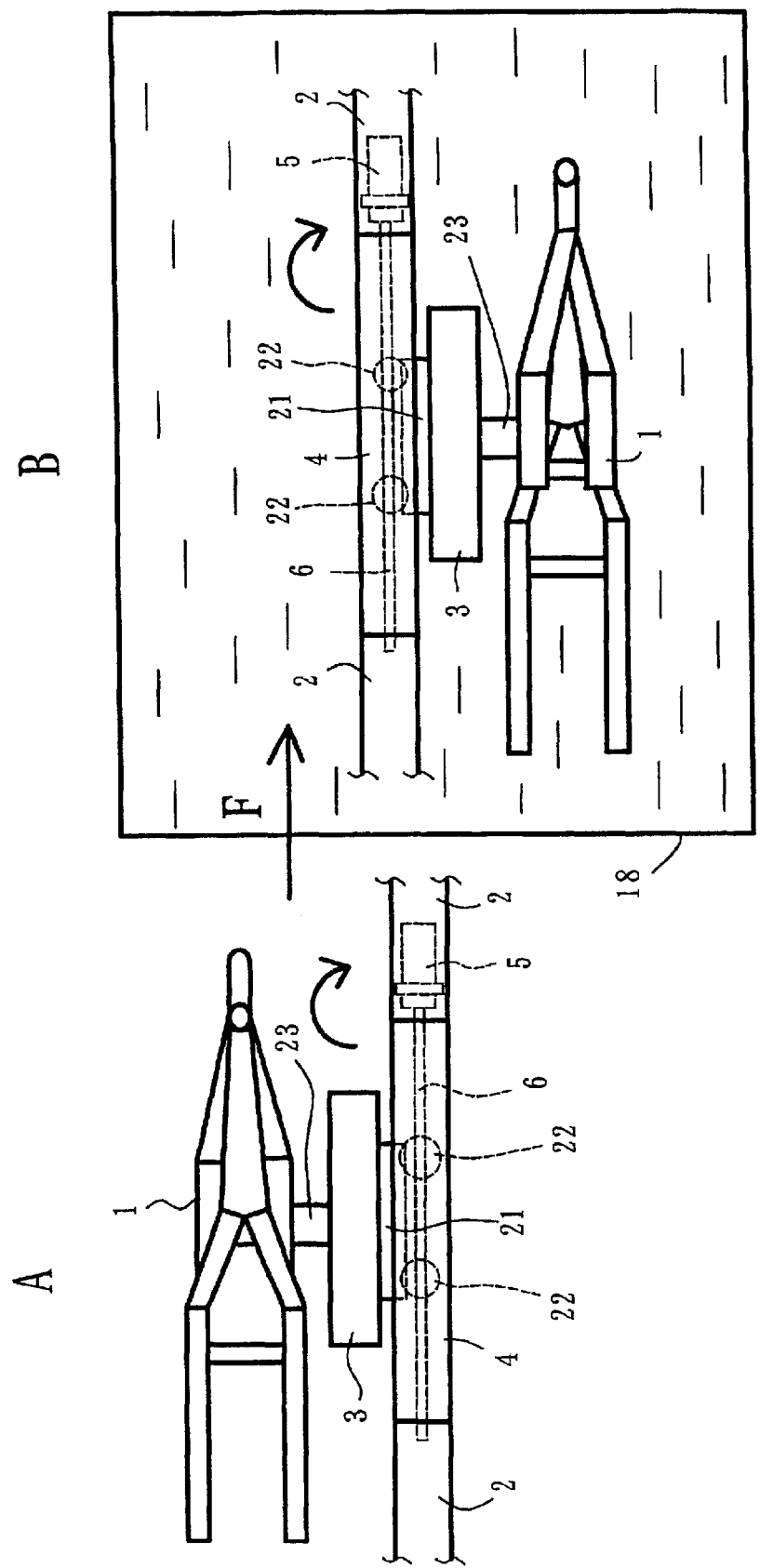
FIG. 8 is a plan view showing the basic parts together with the operation.
Figure 9:
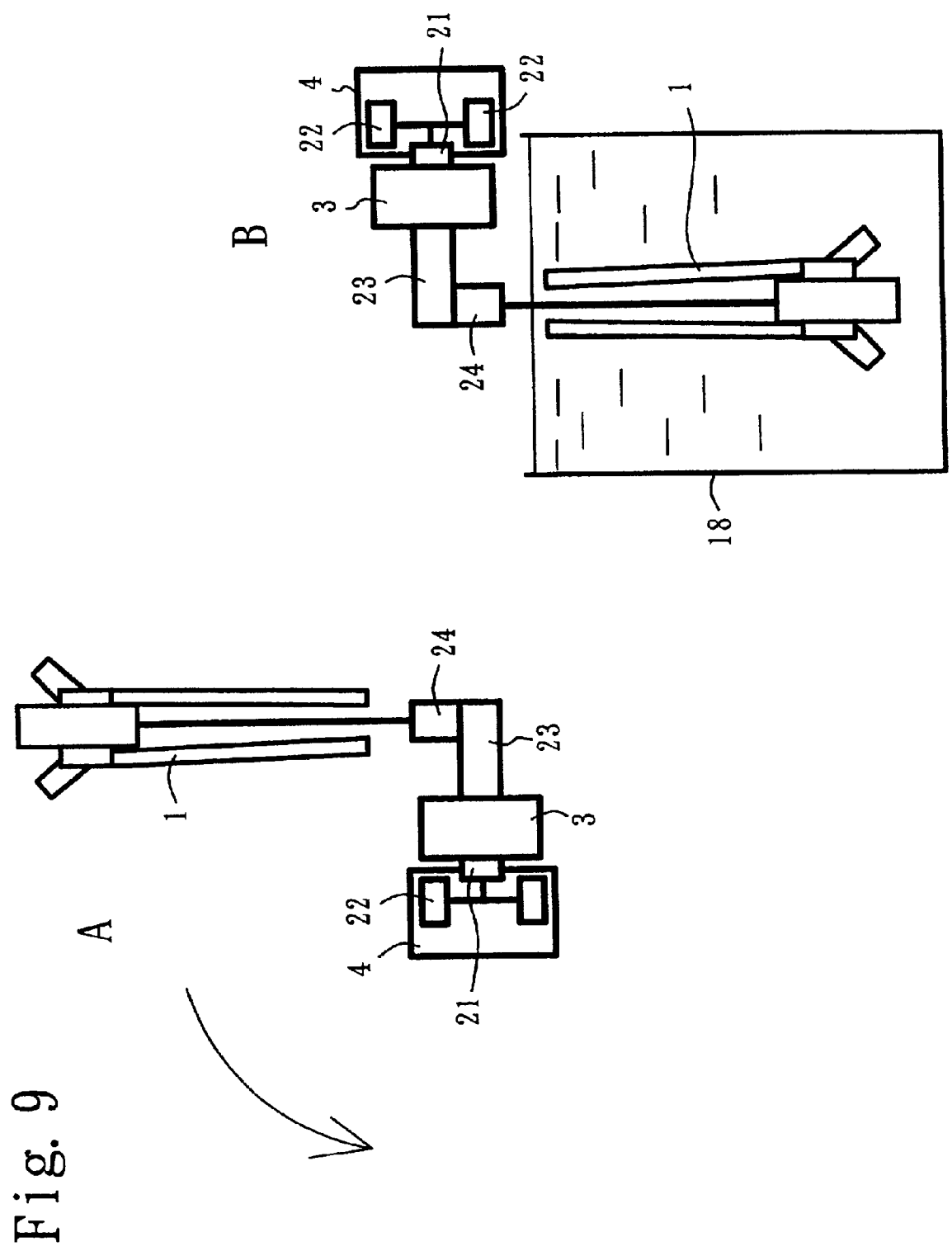
FIG. 9 is a view showing the basic parts viewed from the front against the direction of travel together with the operation thereof.

Next, a second embodiment will be described. FIG. 7 shows a side view of the moveable section and the adjacent section partially cut away and FIG. 8 is a plan view showing the operation thereof. FIG. 9 shows the operation of these sections viewed from the front against the direction of travel F.

In these figures, the conveyor 2 is formed with a hollow box shape and provided in one part with a moveable section 4. The moveable section 4 can be horizontally rotated by a step motor 5 which is fixedly secured to the inside of one side of the conveyor 2 with the movable section inserted between the two sides. A rotational shaft 6 passes through the moveable section 4 and extends to the other side of the conveyor 2. One end of the rotational shaft 6 is fixedly secured to a vertical wall 8. The moveable section 4 rotates synchronously with the rotational shaft 6 as the vertical walls 7 and the rotational shaft 6 are arranged to be integrally rotatable.

The carrier 3 is so connected as to move along each side of the conveyor 2 and the moveable section 4. A projection 21 of the carrier 3 projects to the inside of the conveyor 2 and the moveable section 4 through slits 20 which are continuously formed in each side thereof in the longitudinal direction. The projection 21 supports rollers 22 that are provided at four-corners, back and front and upper and lower.

The carrier 3 can be freely moved by the rollers 22 which roll on the inside of the conveyor 2 and the moveable section 4 and is moved in the direction of travel F by a suitable driving means (not shown). A horizontal arm 23 extends laterally from one side of the carrier 3, and one end 24 thereof supports the workpiece 1 such as a motorcycle in an upright condition which corresponds to a condition of the motorcycle in use (FIG. 9A). As shown in FIG. 8A, the workpiece 1 is supported on one side of the conveyor 2 and the moveable section 4 (on the left side in the present embodiment).

An operation of the present embodiment will now be described. After the carrier 3 moves above the electrodeposition paint bath 18, it stops moving and the step motor 5 rotates 180°. As a result, the moveable section 4 rotates horizontally to the overhead conveyor position as shown in FIG. 8B and FIG. 9B, wherein the same dipping process as for the previous embodiment can be performed. Since the dipping process is the same as in the previous embodiment, further description is omitted.

Figure 10:
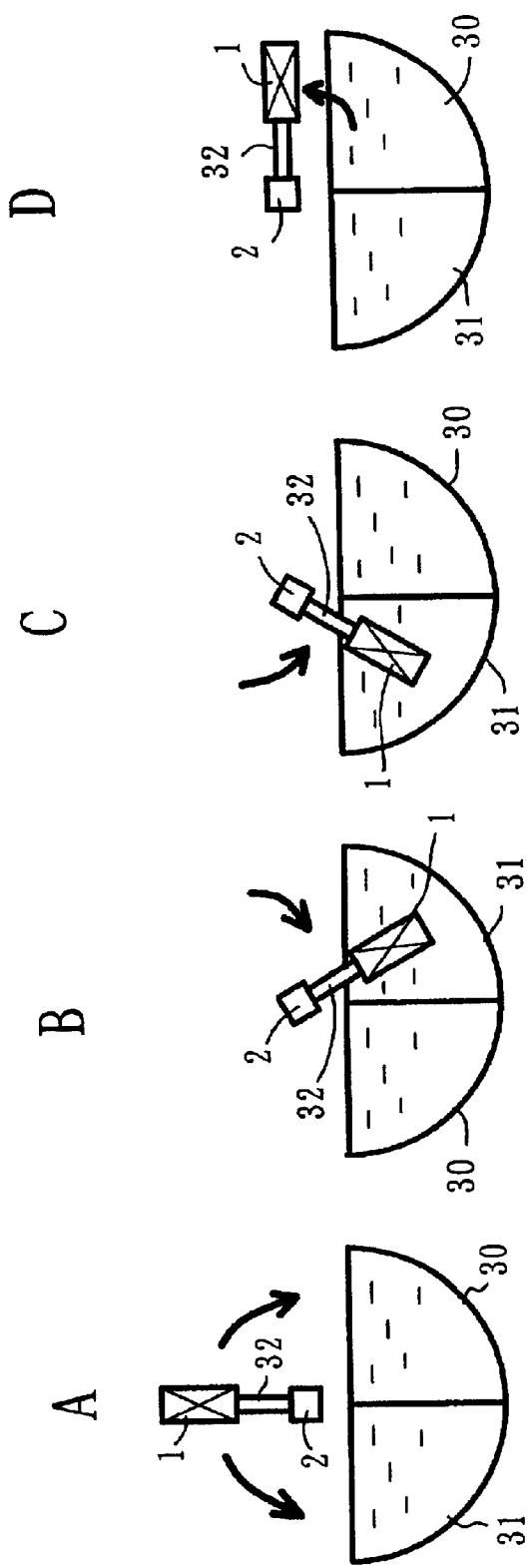
FIG. 10 is a view explaining the principle of a third embodiment.
Figure 11:
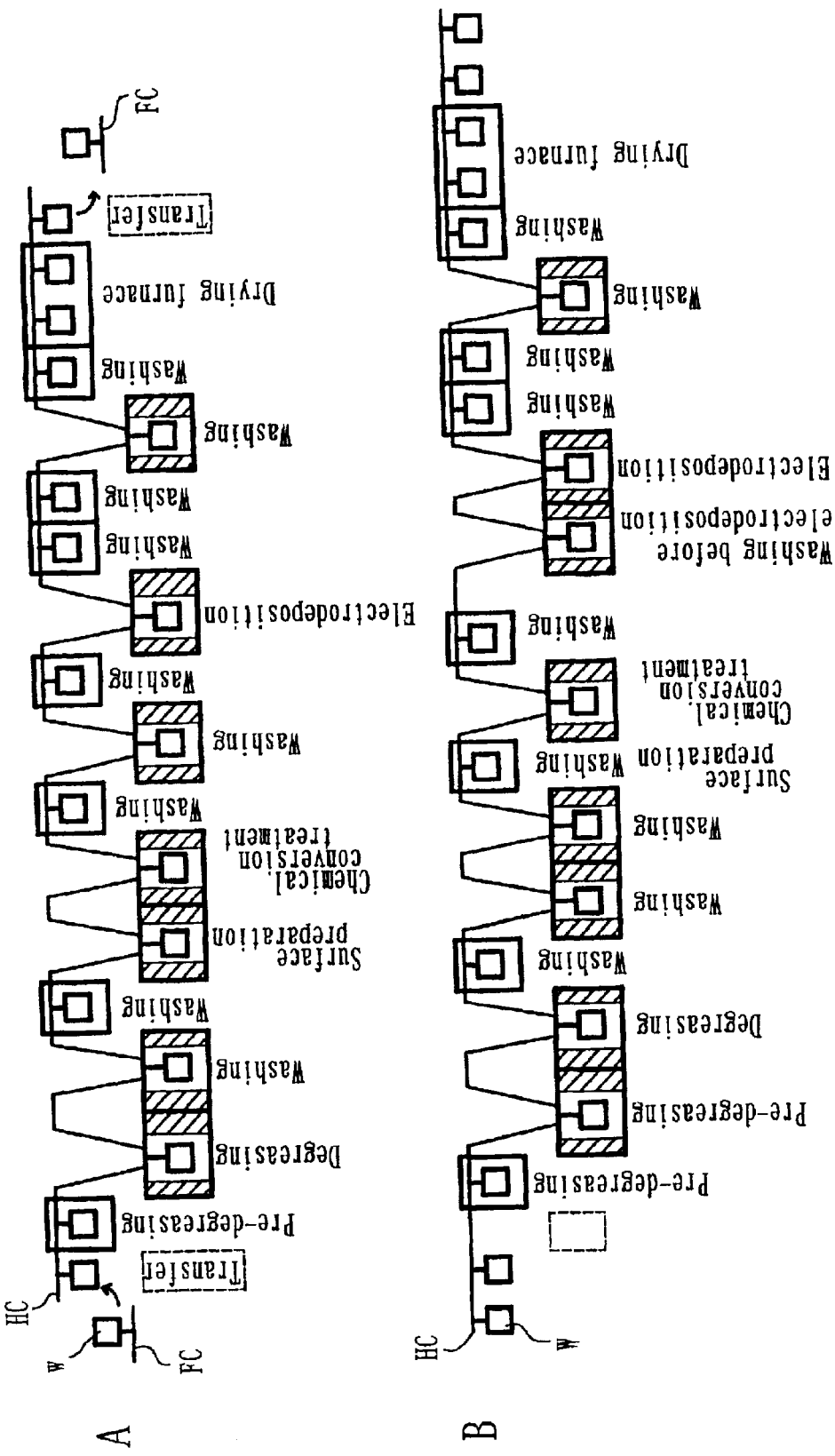
FIG. 11 is a flow chart of the prior art in a vehicle body painting line.

A third embodiment of the present invention will now be described. FIG. 10 shows two treatment baths for dipping and the like which are adjacently disposed, right and left. The conveyor 2 is positioned above a border between the two baths and the workpiece 1 is supported through the supporting arm 32 to be horizontally rotatable in either the left or right direction. The rotational mechanism utilized here may be either one of the first and second embodiments.

The treatment baths 30, 31 for dipping and the like, each of which is formed symmetrically to have a substantially ¼ circular section and combined to form a substantially semicircular section. An outer wall of each treatment bath 30, 31 for dipping and the like is formed to have an arc shape which corresponds to a trajectory of the workpiece 1 which rotates horizontally, right and left, around the conveyor 2, whereby the amount of the treatment solution in the baths can be minimized.

A in the figure shows a neutral position of the workpiece 1 which is a floor conveyor position. This is a basic form when the workpiece 1 moves between the treatment baths for dipping and the like (not shown) adjacently provided in the forward and backward direction. The dipping treatment is started by rotating the workpiece 1 in either the right or left direction from this condition.

B and C in the figure show the condition in which the dipping treatment is performed, wherein the workpiece 1 is immersed in the right treatment bath 30 for dipping and the like (B) when rotated clockwise, while the workpiece 1 is immersed in the left treatment bath 31 for dipping and the like (C) when rotated counter-clockwise. Thus, the treatment bath for dipping and the like can be selected by the direction of the horizontal rotation. It is also possible to realize a uniform or sufficient dipping treatment by swinging the workpiece 1 within the treatment bath for dipping and the like or by rotating the workpiece 1 around the axis of the supporting arm 32.

D in the figure shows the condition in which the dipping treatment is completed which is the side conveyor position in which the workpiece 1 is extraced from the treatment bath 30 or 31 for dipping and the like. Excessive treatment solution attached to the workpiece 1 can be fully drained therefrom by maintaining this position for a predetermined time. At this time, if the workpiece 1 is caused to incline a little, rotated around the axis of the supporting arm 32, or swung at a small angle, it is more effective to cause the excessive solution to drain from the workpiece 1.

In this manner, since the treatment baths 30, 31 for dipping and the like are positioned side by side, right and left, when like treatments are performed, but either the left or right bath must be selected, the bath can be selected by rotating the workpiece 1 horizontally. It is therefore possible to shorten the length of the equipment in the direction of travel and to provide compact installation of the equipment.

Figure 13:
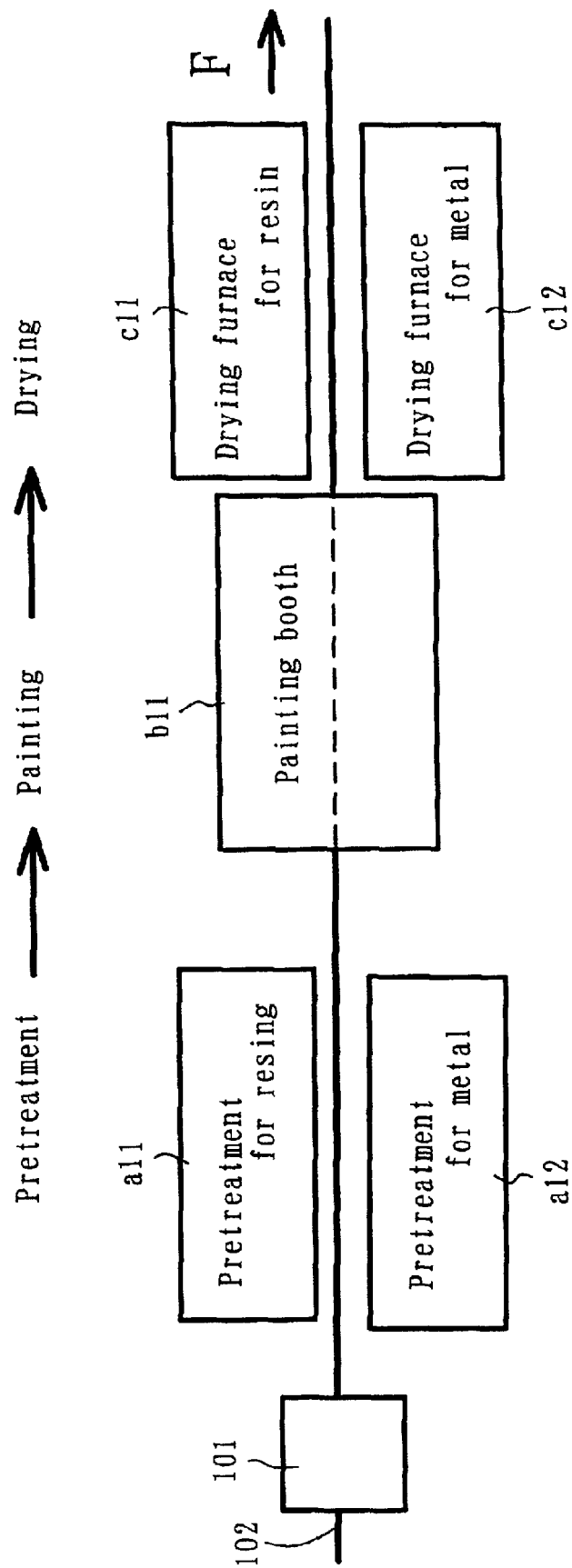
FIG. 13 is a flow chart showing a painting line applicable to each embodiment.

A fourth embodiment applied to a body painting line for a motorcycle will be described below with reference to the accompanying drawings. FIG. 13 is a flow chart of this painting line which includes three processes, that is, pretreatment, painting, and drying. A workpiece 101 which is a frame body of a motorcycle is supported and carried on a conveyor 102 extending directly between these processes.

Relative to the conveyor 102, in the pretreatment process, a pretreatment section a11 for resin and a pretreatment section a12 for metal are oppposedly arranged on the left and right sides, and in a painting process subsequent to these pretreatment sections, a single painting booth b11 is provided on the conveyor 102. In the drying process subsequent to this painting booth b, a drying furnace c11 for resin and a drying furnace c12 for metal are oppposedly arranged on the left and right sides of the conveyor, respectively.

FIGS. 6 to 9 are available for a workpiece conveyance mechanism as well as for embodiments described hereinafter.

Figure 12:
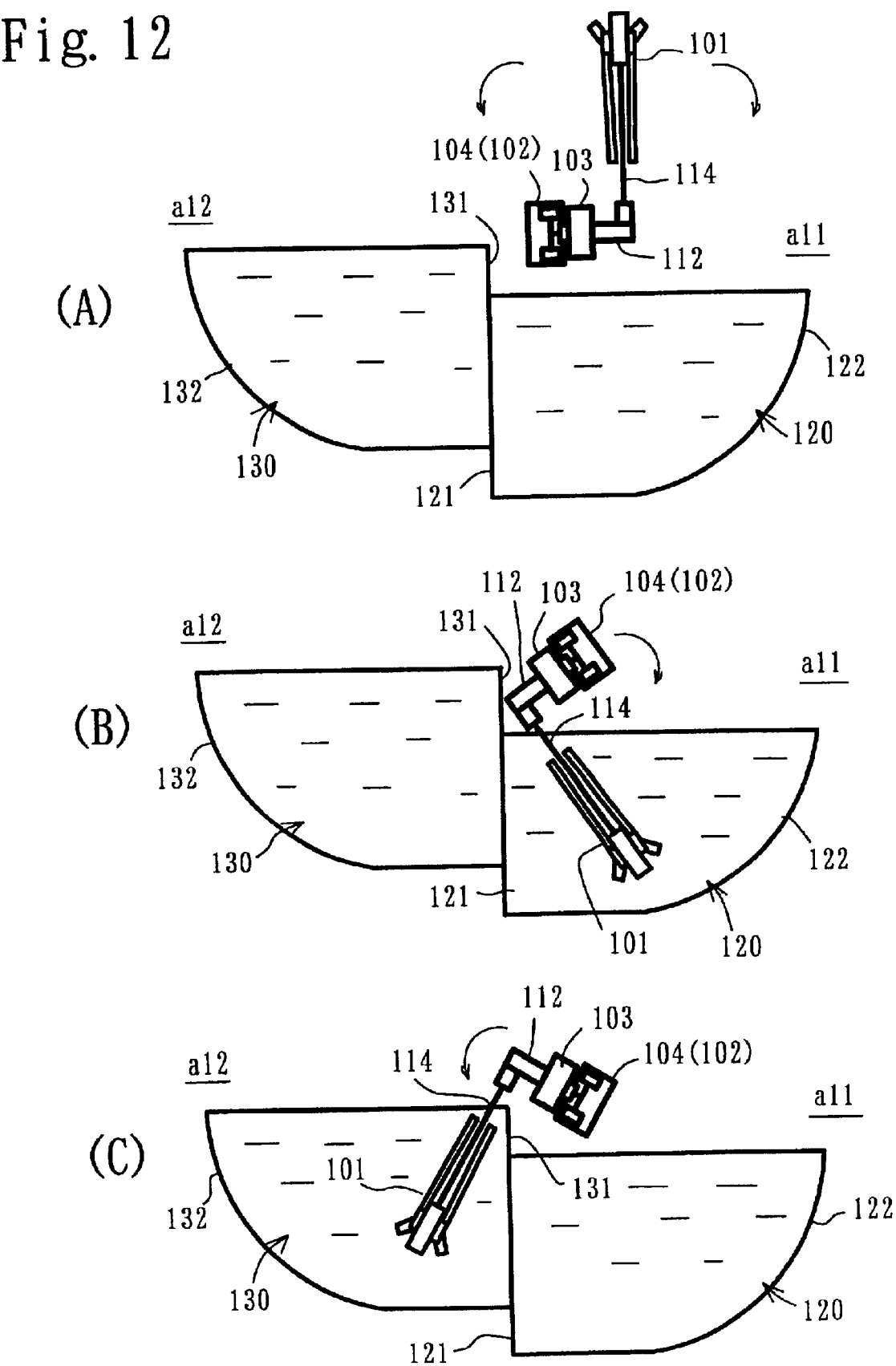
FIG. 12 is a view explaining the principle of a treatment according to a fourth embodiment.

FIG. 12 is a view showing the principle of operation of the workpiece 101 in the pretreatment process viewed from the direction F of travel of the conveyor 102. Specifically in the pretreatment a1 for resin and the pretreatment a12 for metal, a pretreatment bath 120 for resin and a pretreatment bath 130 for metal are opposedly arranged left and right respectively to place the conveyor 102 therebetween. These baths are filled with treatment solution containing different compositions in accordance with the material of the object to be treated.

As shown in this Figure, the resin pretreatment bath 120 and the metal pretreatment bath 130 are each constituted symmetrically to form a generally ¼ circle like cross section, and are combined to make a generally semi-circle like cross section when combined. The resin pretreatment bath 120 and the metal pretreatment bath 130 are positioned adjacent to each other below the conveyor 102. Also, outer side surface walls 122, 132 of the resin pretreatment bath 120 and the metal pretreatment bath 130 respectively are formed in a circular arch shape corresponding to the trajectory of rotation of the workpiece 101. The treatment bath thus has a small capacity and a minimum amount of treatment solution is consumed. As a result, cost saving is possible.

Partition walls 121, 131 which divide the resin pretreatment bath 120 and the metal pretreatment bath 130 differ in height. A step is therefore formed between the resin pretreatment bath 120 and the metal pretreatment bath 130. In the present embodiment, the side of the resin pre-treatment bath 120 is low and the side of the metal pretreatment bath 130 is high. This relationship may be reversed.

The conveyor 102 is located near the border portion of both baths and above the resin pretreatment bath 120. However, this location, also, can be set optionally, according to the rotation mechanism of the workpiece 101, condition of the treatment bath side, or the like. The movable portion 104 is provided on the conveyor 102 at a position above the resin pretreatment bath 120 and the metal pretreatment bath 130. Further, the movable portion may also be provided on the conveyor 102, even for the drying process, though it is abbreviated in the drawing.

FIG. 12(A) shows a workpiece position at the beginning of the pre-treatment process, or when the process has terminated, this being a floor conveyor position in the present embodiment. That is, this is a basic position before starting the treatment or after terminating it, and forms a principle position when moving between the other processes. Thereafter, when the pre-treatment has started, the movable portion 104 rotates horizontally and selectively in either the clockwise or the counterclockwise direction.

By this, the position changes to the overhead conveyor position, and the workpiece is immersed in the resin pretreatment bath 120 (FIG. 12(B)) or in the metal pretreatment bath 130 (FIG. 12(C)). Therefore, the shape, the arrangement relationship, and the like of the resin pretreatment bath 120 and the metal pretreatment bath 130 are set to provide a dipping treatment when the workpiece 101 rotates horizontally, as shown in FIG. 12 (B) or FIG. 12(C).

The following description outlines the operation of the present embodiment. As shown in FIG. 12, the motion is stopped (FIG. 12(A)) when the carrier 103 supporting the workpiece 101 at the floor conveyor position is moved above the resin pretreatment bath 120 and the metal pretreatment bath 130. If the workpiece 101 is made from resin, the movable portion 104 is rotated clockwise by about 180° to immerse the workpiece in the treatment solution of the resin pre-treatment bath 120 (FIG. 12(B)). If the workpiece 101 is made from metal, the movable portion 104 is rotated in the counter-clockwise direction about 180° to immerse the workpiece in the metal pretreatment bath 130 (FIG. 12(C)). The dipping treatment is carried out with treatment solution containing an exclusive composition adjusted as a pretreatment for resin or for metal.

Thereafter, by the movable portion 104 being rotated in the reverse direction, the workpiece 101 rotates horizontally in the reverse direction and emerges from the resin pretreatment bath 120 or the metal pretreatment bath 130 to be positioned above the surface of the treatment solution, and soon, returns to its original position, that is, it assumes the basic floor conveyor position. At this time, since the conveyor 102 remains above the resin pretreatment bath 120, if the pretreatment for metal was performed, the workpiece 101 is retained for a while at the side conveyor position, above the surface of the treatment solution after emerging from the metal pretreatment bath 130 to prevent the treatment solution from dripping from the workpiece 101. Because dripping is prevented, since a step portion is provided between the resin pretreatment bath 120 and the metal pretreatment bath 130, there is little that the treatment solution will drop into the adjoining treatment bath and mix with the solution in that bath.

After the pretreatment is terminated, the workpiece enters a common painting booth b (FIG. 13), and painting is commonly performed for the resin workpiece and the metal workpiece. On completion of the painting, as a result of further horizontal rotation of the movable portion 104, the workpiece enters either a drying furnace c1 for resin or a drying furnace c2 for metal depending on the material constituting the workpiece 101 and is dried therein. At this time, the drying is performed at about 80° C. in the drying furnace c1 for resin and at about 140° C. in the drying furnace c2 for metal, the workpiece being treated at an optimum temperature depending on the material.

As mentioned above, in the pretreatment process of the painting line, even if the treatment differs for the resin workpiece 101 and the metal workpiece 101, by horizontal rotation of the movable portion 104 in the forward or reverse direction, the treatment can be selectively carried out in the resin pretreatment bath 120 or the metal pretreatment bath 130, suitable for the material of the workpiece 101. Also, as in the painting process, in the case where treatment depending on the material is unnecessary, a common treatment may be optionally performed by not providing the movable portion 104 in the painting process or by not enabling its operation.

Accordingly, regardless of whether a resin workpiece 101 or metal workpiece 101 is treated, since workpieces 101 of different kinds of materials can be transferred in mixed condition, production is possible in a common line without the necessity of providing an exclusive line for each material so that it is possible to save space for line installation and to reduce investment costs. Also, since the conveyance apparatus is capable of continuously transferring different kinds of materials without the necessity of switching to accommodate each material, switching loss does not occur. Furthermore, lot production is not necessary, therefore production can be synchronized with another department.

Moreover, the side by side arrangement to the left and right of the resin pre-treatment bath 120 and the metal pretreatment bath 130 obviously shortens the total length of the apparatus in comparison with a longitudinal arrangement in the direction of travel and it is possible to provide compact equipment. Accordingly, this is advantageous in the case which includes a process treating the same kind of material in an alternate manner.

Figure 14:
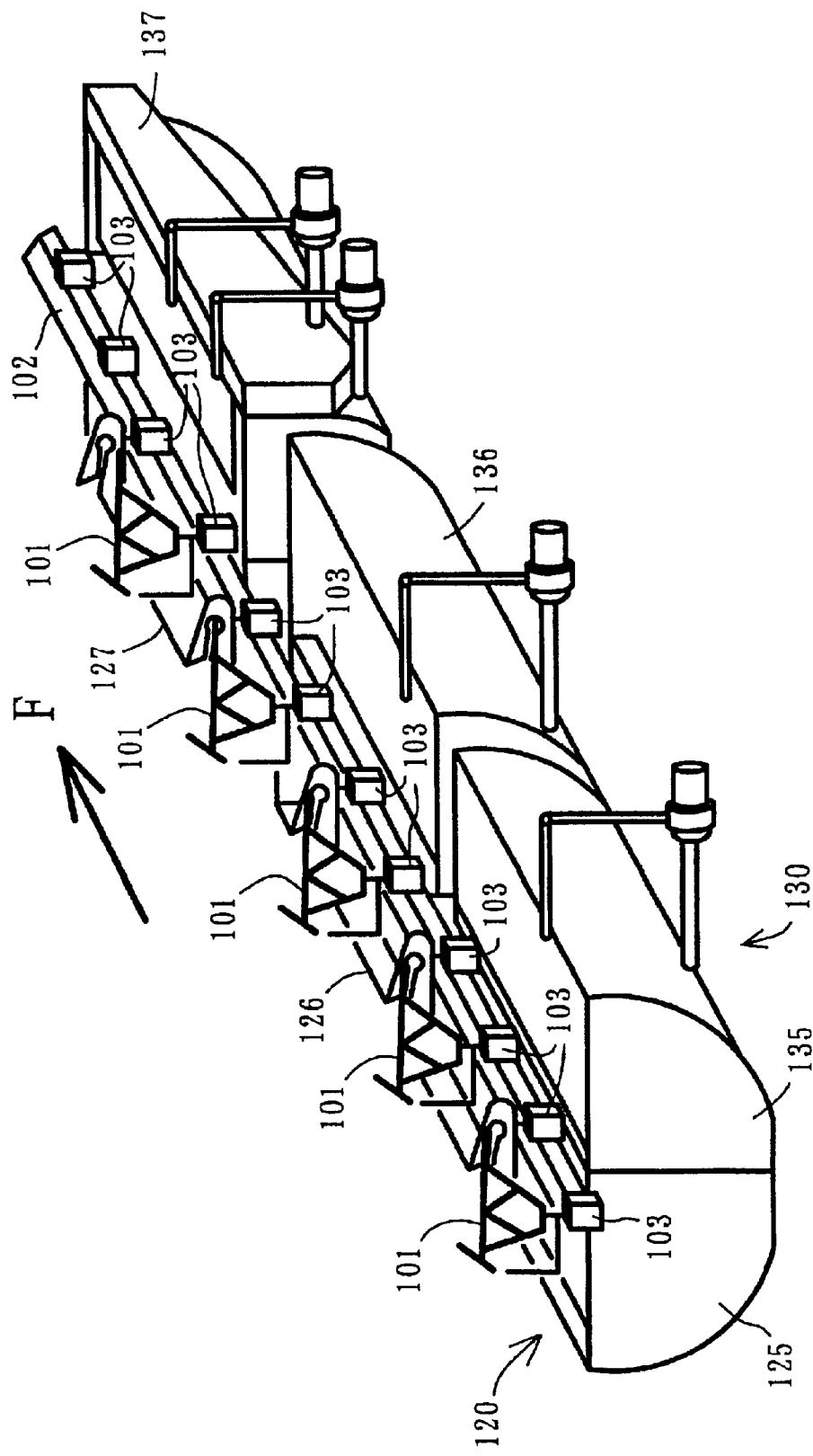
FIG. 14 is a perspective view of a fifth embodiment.
Figure 15:
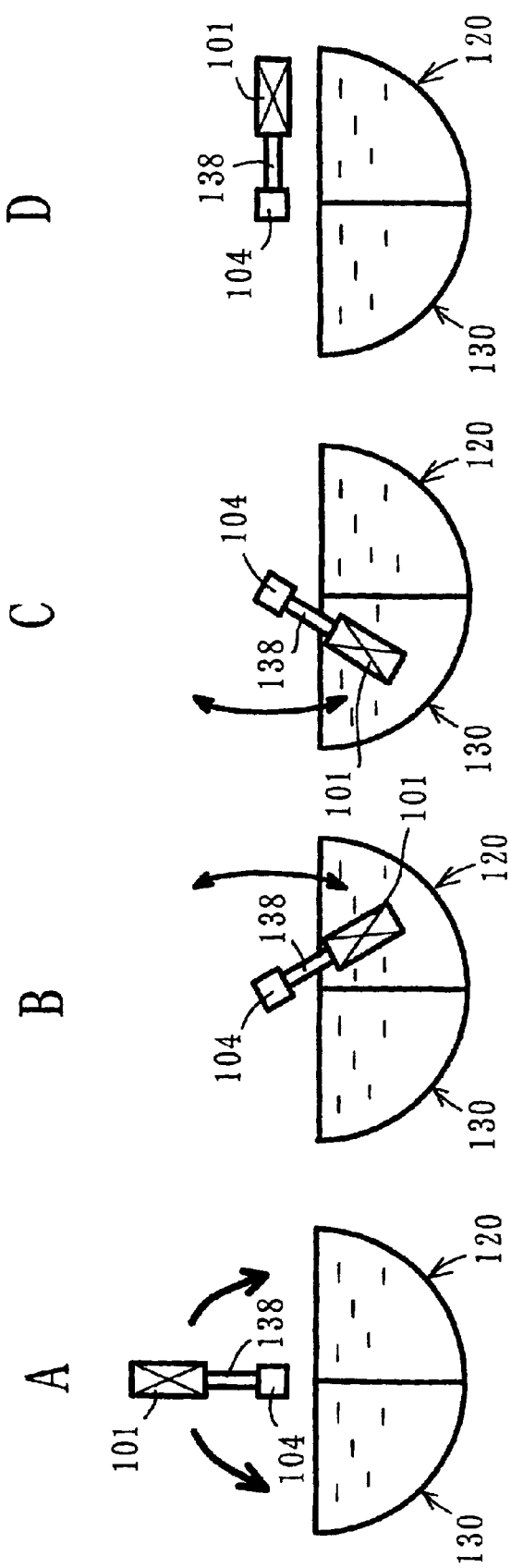
FIG. 15 is a view similar to FIG. 12 of the fifth embodiment.

The following description covers a fifth embodiment with reference to FIGS. 14 and 15. The present embodiment also relates to pretreatment in a painting line with respect to the frame body of a motorcycle, as in the former embodiment. FIG. 14 shows a perspective view of this pretreatment, and FIG. 15 is a view as in FIG. 12 showing in principle a dipping treatment in this pretreatment. As apparent from these figures, a resin pretreatment bath 120 and a metal pretreatment bath 130 are arranged oppositely by placing a conveyor 102 therebetween.

As shown in FIG. 14, as a resin pretreatment bath 120, there are disposed and provided in series a degreasing bath 125, a chemical conversion treatment bath 126, and a washing bath 127 along the direction of travel F of the conveyor 102. Also, a degreasing bath 135, a chemical conversion treatment bath 136 and a washing bath 137 which are constituted as a metal treatment bath 130, are disposed and provided in series oppositely with the conveyor 102 positioned therebetween, along the direction of travel F of the conveyor 102.

The conveyor 102 is essentially located immediately above a border portion between the resin pretreatment bath 120 and the metal pretreatment bath 130. The workpiece 101 which is similar to that in the former embodiment is supported in an upright condition from an upper surface of the conveyor 102 in the floor conveyor position. Unlike the horizontal rotation while being supported on one side of the conveyor 102 as in the former embodiment, the horizontal rotation in the dipping treatment has the same trajectory for either the resin pretreatment bath 120 side or the metal pretreatment bath 130.

The workpecec 101 is supported laterally, and the same treatment bath is capable of providing a dipping treatment simultaneously for multiple workpieces 101. In the dipping treatment, the workpiece is immersed in the treatment solution from a front portion or a rear portion with rotation, whereby resistance is reduced when the workpiece 101 is immersed in or emerges from the treatment solution.

The carrier 103, to which the workpiece 101 is attached, also rotates horizontally, integrally with the movable portion 104 of the conveyor 102 and is arranged to move like a monorail on the conveyor 102. The carrier 103 and the movable portion 104 can be voluntarily changed to suitable construction.

FIG. 15 is a view showing the principle of a dipping treatment utilizing a resin pretreatment bath 120 and a metal pretreatment bath 130. These baths are shown diagrammatically as a representation of each treatment bath. As shown in this figure, the resin pretreatment bath 120 and the metal pretreatment bath 130 are similar to those of the former embodiment. However, in the present embodiment, the heights of adjoining wall surfaces of each treatment bath constituting the resin pre-treatment bath 120 and the metal pretreatment bath 130 are identical.

A in FIG. 15 is a neutral position of the workpiece 101 and constitutes the floor conveyor position, which is the basic form when the workpiece 1 moves between dipping baths arranged to be adjacent in the longitudinal direction. The dipping pretreatment is started by rotating the workpiece 101 horizontally from this condition in the left or right direction.

B and C in FIG. 15 are conditions during the dipping treatment. If the workpiece 101 is rotated horizontally clockwise, it becomes immersed in the right resin pretreatment bath 120 (B), and if the workpiece 101 is rotated horizontally in the counter clockwise direction, it becomes immersed in the metal pretreatment bath 130 on the left (C), therefore the dipping bath can be selected according to the direction of horizontal rotation.

D in FIG. 15 is the condition at the end of the dipping treatment, with the workpiece 101 assuming the side conveyor position in which a supporting arm 138 is placed in a substantially horizontal position and the workpiece 101 is drawn upward from the resin pre-treatment bath 120 or the metal pretreatment bath 130. This position is retained for a required time, whereby excessive treatment solution adhering to the workpiece 101 can drip into the bath. This operation becomes more effective if the workpiece 101 is slanted a little, is rotated about the axis of the supporting arm 138, or is swung at slight angle.

In this manner, if the workpieces 101 are supported side by side laterally, a plurality of workpieces 101 can be treated at the same time to increase efficiency, whereby the total length of the equipment need not excessive. Also, if the workpiece 101 is supported immediately above the conveyor 102, the structure is simplified since the workpiece 101 can be rotated horizontally in the same manner in both the left and right directions so that the apparatus can be constructed symmetrically in the left and right directions.

Further, since the conveyor 102 is provided in a straight line above a plurality of treatment baths (125, 126, 127, 135, 136 and 137) in the same horizontal plane, the time required for transfer between the treatment baths is shortened, in comparison with a prior art conveyor which is curved and vertically provided above the treatment baths. Also, because when the workpiece 101 starts its horizontal rotation, it enters the treatment bath while commencing a rapid downward movement and then moves in the bath while swinging, the downward movement and the rotation in the treatment bath which have required two actions in the prior art, can be performed in one action at the same time. Therefore, the time required for this treatment is also shortened, whereby the total treatment time is shortened, providing an increase in efficiency. Moreover, the apparatus is simple in structure and is easily maintained.

Further, the present invention can be modified and applied without limitation to each of the above-mentioned embodiments. The conveyance line which is an object of the invention is not limited to a painting line, but may be applied to a production/assembly line for vehicle bodies and the like. The treatment which is also an object of the invention is not limited to the dipping treatment, but can include treatments such as assembly, machining or the like, other than surface treatment. The workpiece is not limited to the kinds of materials discussed here and the same kinds of workpieces. For example, a combination of different kinds of articles, such as a combination of a metal vehicle body and interior and exterior ornamental parts made from resin may be handled.

A sixth embodiment applied to a body painting line for a motorcycle will be described below with reference to the accompanying drawings. C of FIG. 17 is a view showing this electrodeposition painting line and a workpiece 201 which is the body of a motorcycle is supported and transported on a conveyor 202 extending straight. This conveyor 202 corresponds to the main line in the prior art.

At the left and right sides of the conveyor 202 are provided a first painting bath 220 and a second painting bath 230 respectively which are the painting sections for electrodeposition painting and which have different colored paints contained in each. The first paint bath 220 contains paint of color 1, and the second paint bath 230 contains color 2. However, these colors are optional. For example, it is possible to have gray as color 1, and red as color 2 or the like.

Figure 16:
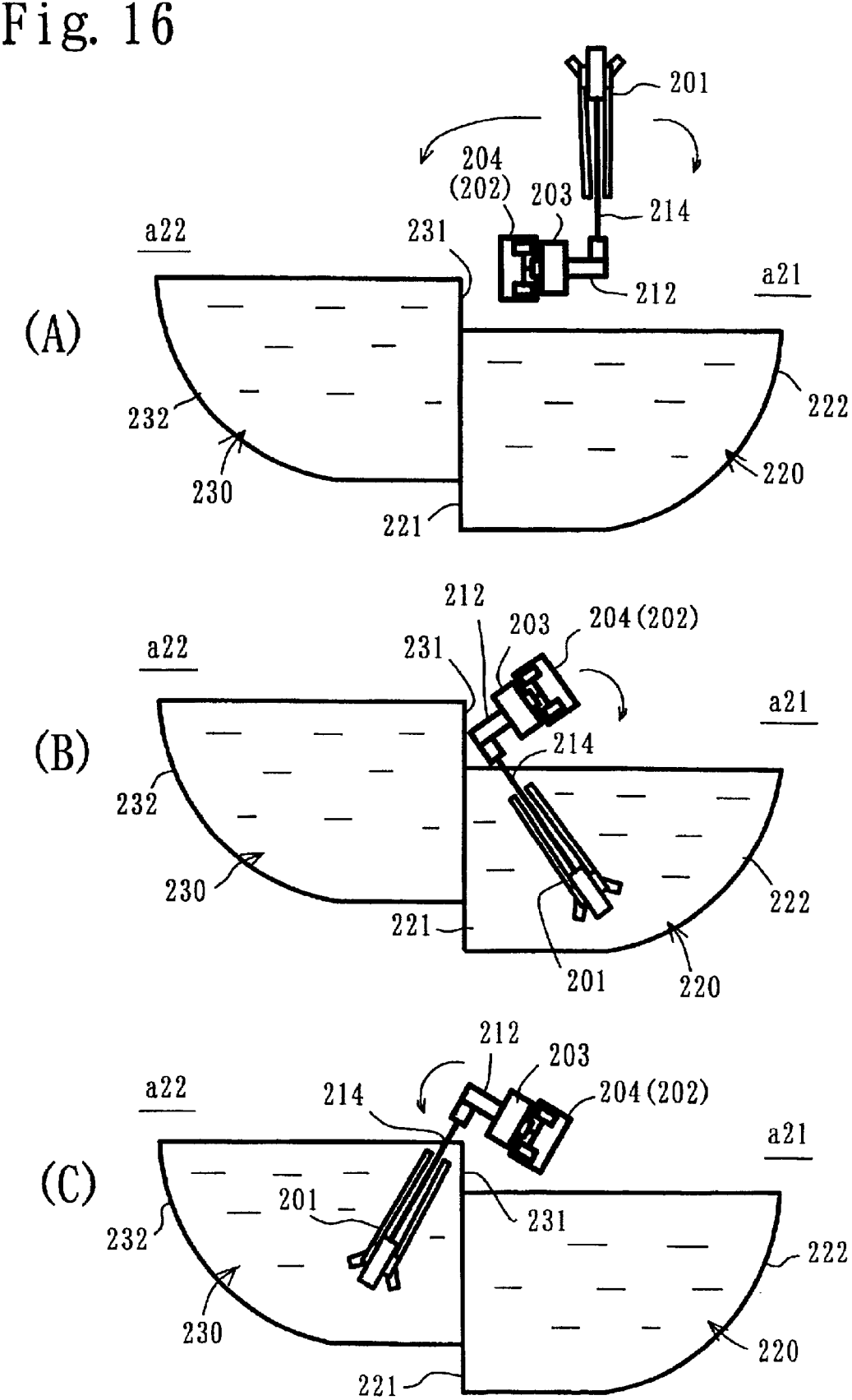
FIG. 16 is a view explaining the principle of a treatment according to a sixth embodiment.

FIG. 16 is a view showing the principle of operation of the workpiece 201 in the electrodeposition paint process viewed from the direction of travel F of the conveyor 202. Specifically, the first paint bath 220 and the second paint bath 230 are opposedly arranged left and right to position the conveyor 202 therebetween and each is filled with a different colored paint, color 1 or color 2.

As shown in this figure, the first paint bath 220 and the second paint bath 230 are each constituted symmetrically to form a generally ¼ circle like cross section, and are combined to make a generally semi-circle like cross section when combined, the first paint bath 220 and the second paint bath 230 are positioned adjacent to each other below the conveyor 202. Also, outer side surface walls 222, 232 of the first paint bath 220 and the second paint bath 230 respectively are formed in a circular arch shape corresponding to the trajectory of rotation of the workpiece 201. The treatment bath thus has a small capacity and the minimum amount of paint is consumed. As a result, cost saving is possible.

Partition walls 221, 231 which divide the first paint bath 220 and the second paint bath 230 differ in height. A step is therefore formed between the first paint bath 220 and the second paint bath 230. In the present embodiment, the side of the first paint bath 220 is low and the side of the second paint bath 230 is high. However, this relationship may be reversed.

The conveyor 202 is located near the border portion of both baths and above the first paint bath 220. However, this location, also, can be set optionally according to the rotation mechanism of the workpiece 201, condition of the paint bath side, or the like. The movable portion 204, also, is provided on the conveyor 202 at a position which is above the first paint bath 220 and the second paint bath 230.

FIG. 16(A) shows a workpiece position at the beginning of the electrodeposition process, or when the process has terminated, this being a floor conveyor position in the present embodiment. That is, this is a basic position before starting the treatment or after terminating it, and forms a principle position when moving between the other processes. Thereafter, when the electrodeposition painting process has started, the movable portion 204 then rotates horizontally and selectively in either the clockwise or the counterclockwise direction.

By this, the position changes to the overhead conveyor position, and the workpiece 201, as shown in FIG. 16(B), is immersed in the first paint bath 220, or, as shown in FIG. 16(C), is immersed in the second paint bath 230. Therefore, the shape, the arrangement relationship, and the like of the first paint bath 220 and the second paint bath 230 are set to provide a dipping step when the workpiece 201 rotates horizontally, as shown in the above FIG. 16(B) or FIG. 16(C).

The following description outlines the operation of the present embodiment. As shown in each drawings of FIG. 16, the motion is stopped (FIG. 16(A)) when the carrier 203 supporting the workpiece 201 at the floor conveyor position is transported above the first paint bath 220 and the second paint bath 230. If the color for painting the workpiece 201 is color 1, the movable portion 204 is rotated in a clockwise direction by about 180° to immerse the workpiece in the paint of the first paint bath 220 (FIG. 16(B)). If the color is to be color 2, the movable portion 204 is rotated in a counter-clockwise direction about 180° to immerse the workpiece into the paint bath 230 (FIG. 16(C)). The dipping treatment is carried out with the respective paints of color 1 or color 2 for electrodeposition painting.

Thereafter, by the movable portion 204 being rotated in the reverse direction, the workpiece 201 rotates horizontally in the reverse direction and emerges from the first paint bath 220 and the second paint bath 230 above the liquid surface, and soon, returns to its original position, that is, it assumes the basic floor conveyor position, At this time, since the conveyor 202 remains above the first paint bath 220, if electrodeposition painting is performed, the workpiece is retained for a while at a side conveyor position above the liquid surface after emerging from the second paint bath 230 to allow the paint to sufficiently drip from the workpiece 1 into the bath. When the paint is dripping from the workpiece 201, since a step portion is provided between the first paint bath 220 and the second paint bath 230, there is little that the paint will drip into the adjoining paint bath and mix with the paint in that bath. Shortly after the electrodeposition painting is terminated, the workpiece 201 is sent to a drying process, and further to a subsequent finish coating process.

As mentioned above, in the electrodeposition painting process, even if the paint color differs, being color 1 or color 2, by the horizontal rotation of the movable portion 204 in either the forward or the reverse direction, the target color can be selected from the first paint bath 220 or the second paint bath 230. Accordingly, since the workpieces 201 with different paint colors can be conveyed separately by a single conveyor 202, production is possible on a common line without requiring the provision of an exclusive line for each paint color. It is therefore possible to have a single compact painting line and it is possible to save the space required to install a second line and the investment therefor. Also, since it is unnecessary to replace the painting line for every paint color and it is possible to transfer the workpieces 201 having different paint colors in a mixed condition, so that loss of time for replacement does not occur, and, further, the efficiency can be greatly improved.

Moreover, the side by side arrangement to the left and right of the first paint bath 220 and the second paint bath 230 obviously shortens the total length of the apparatus in comparison with a longitudinal arrangement in the direction of travel and it is possible to provide compact equipment. Accordingly, this is advantageous in the case which includes a painting process in which either of two colors may be selected optionally.

Figure 18:
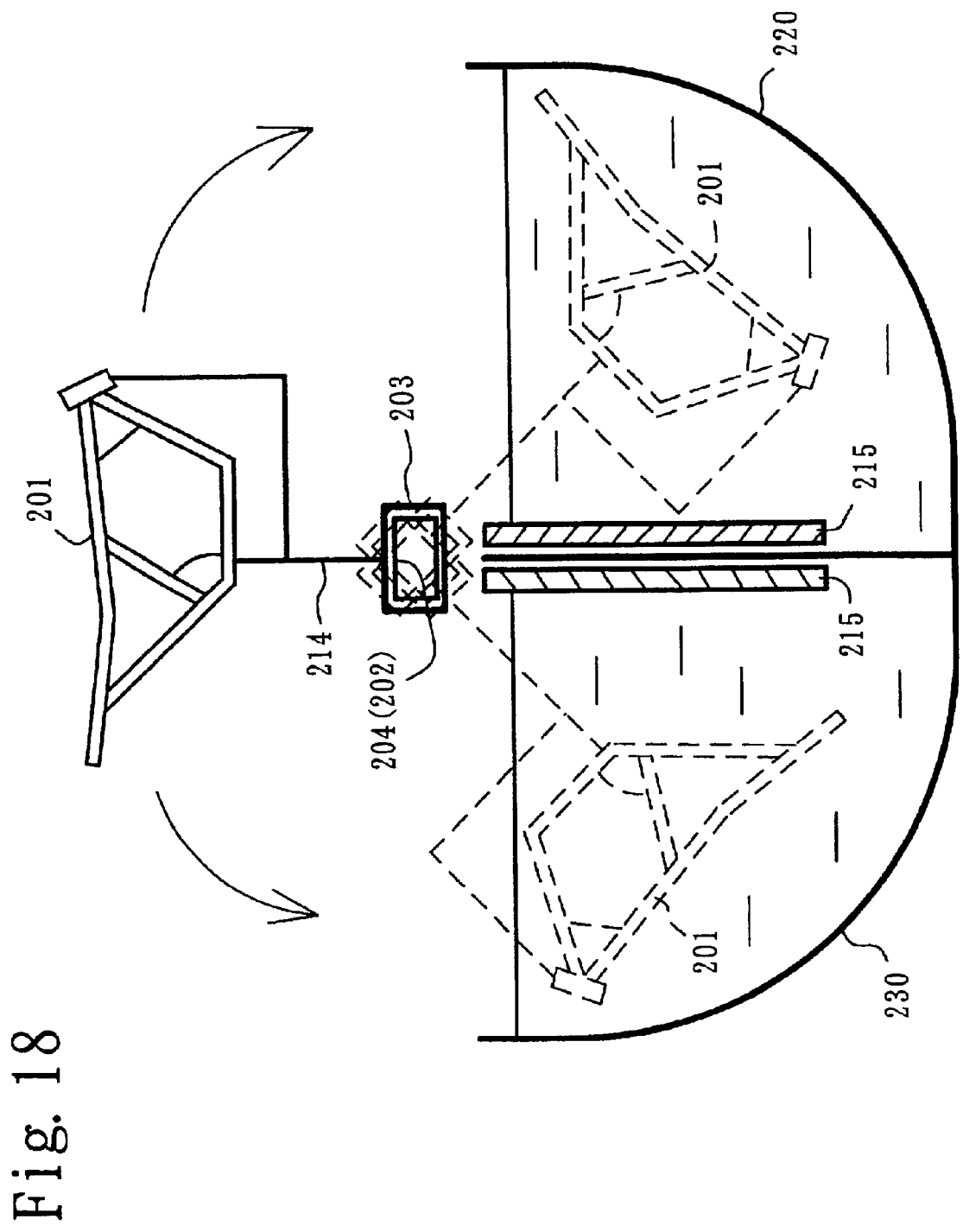
FIG. 18 is a view showing a painting method according to a seventh embodiment.
Figure 19:
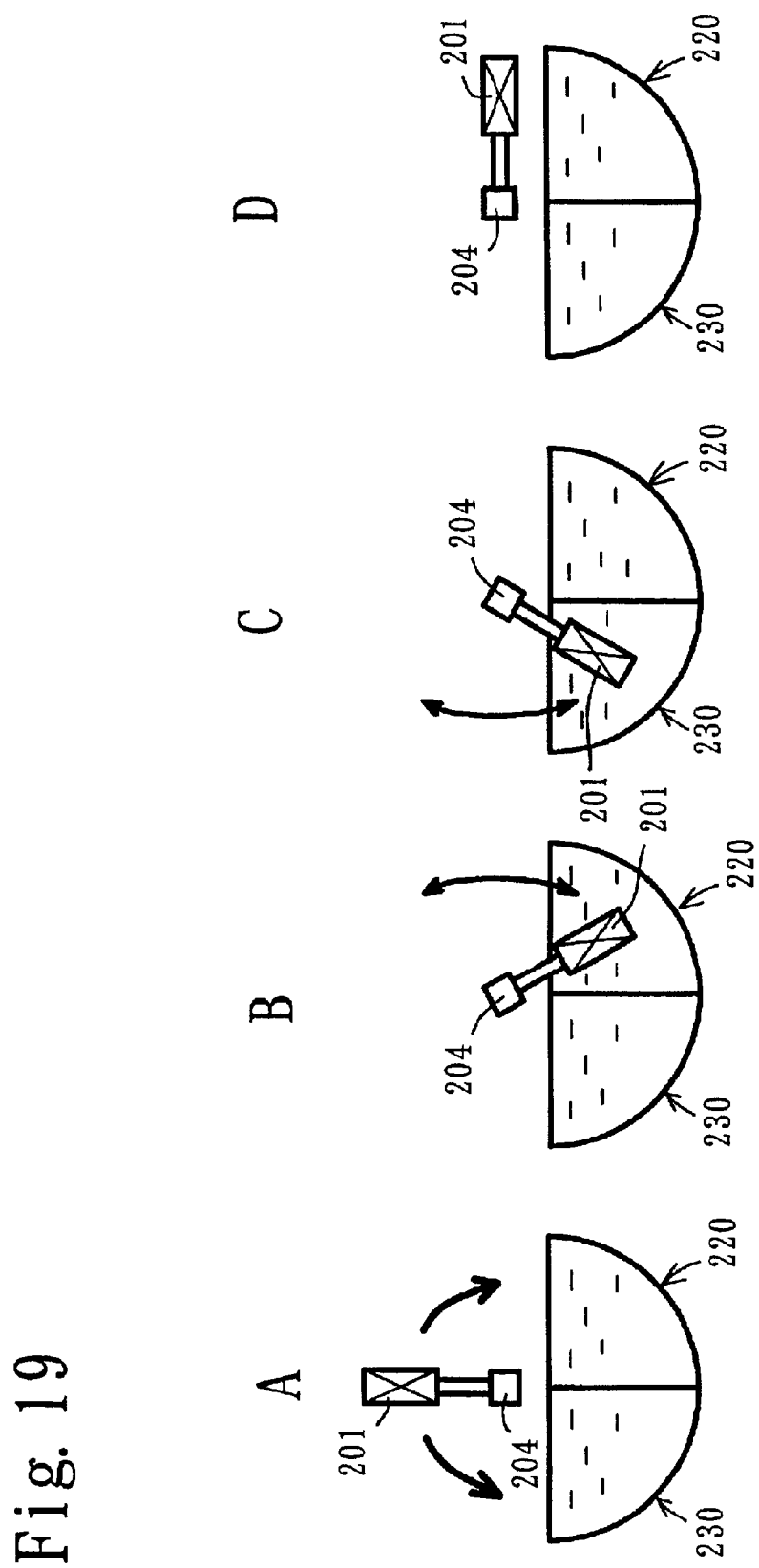
FIG. 19 is a view similar to FIG. 16 of the seventh embodiment.

The following description covers a seventh embodiment with reference to FIGS. 18 and 19. The present embodiment also relates to electrodeposition painting in a painting line for the body of a motorcycle, as in the former embodiment. FIG. 18 shows a view similar to FIG. 16 illustrating an electrodeposition painting method of the present embodiment, and FIG. 19 is a view as in FIG. 16 showing in principle a dipping treatment for this electrodeposition painting process.

As shown in FIG. 18, a first paint bath 220 and a second paint bath 230 are similar to those of the former embodiment, but, in this embodiment, the adjoining wall surfaces of each treatment bath constituting the first paint bath 220 and the second paint bath 230 have the same height. Also, the conveyor 202 of the present embodiment is generally positioned immediately above a border portion of the first paint bath 220 and the second paint bath 230.

The workpiece 201 which is similar to the former embodiment is supported in an upright condition from an upper surface of the conveyor 202 in the floor conveyor position. Unlike the horizontal rotation which being supported on one side of the conveyor 202 as in the former embodiment, the horizontal rotation in the dipping treatment has the same trajectory for either the first paint bath 220 side or the second paint bath 230 side.

Further, since the workpiece 201 is supported laterally and therefore many workpieces 201 can be disposed and provided above the paint bath in the direction of travel, it is possible to dip the plurality of workpieces 201 at the same time in the same paint bath. In the dipping process, the workpiece is immersed in the paint from a front portion or a rear portion with rotation, whereby resistance is reduced when the workpiece 201 is immersed in or emerges from the paint.

The carrier 203 to which the workpiece 201 is attached via a supporting stay 214 also rotates horizontally integrally with the movable portion 204 of the conveyor 202, as in the former embodiment, and is arranged to move like a monorail on the conveyor 202. The carrier 203 and the movable portion 204 can be optionally and selectively constructed. Reference numeral 215 in the figure is an electrode.

A in FIG. 19 is a neutral position of the workpiece 201 and constitutes the floor conveyor position, which is the basic form when the workpiece 1 moves between adjacent dipping baths of the other processes in the direction of travel. The electrodeposition painting is started by rotating the workpiece horizontally from this condition to the left or right.

B and C in FIG. 19 are conditions during the dipping treatment. If the workpiece 201 is rotated horizontally clockwise, it becomes immersed in the first paint bath 220 on the right side (B), and if the workpiece 201 is rotated horizontally in the counterclockwise direction, it becomes immersed in the second paint bath 230 on the left side, whereby the dipping bath can be selected according to the direction of horizontal rotation.

D in FIG. 19 is the condition at the end of the dipping treatment, with the workpiece 201 assuming the side conveyor position in which the workpiece 1 is pulled above the paint bath 220 or the second paint bath 230 so as to be substantially horizontal. This position is retained for a required time to allow the excessive paint adhering to the workpiece 201 to sufficiently drip into the bath. This operation become more effective if the workpiece 201 is slanted a little, is rotated about the axis of the supporting arm 232, or is swung at a slight angle.

In this manner, if the workpieces 201 are supported side by side laterally, a plurality of workpieces 201 can be treated at the same time to increase efficiency, whereby the total length of the equipment need not be excessive. Also, if the workpiece 201 is supported immediately above the conveyor 202, the structure can be simplified since the workpiece 201 can be rotated horizontally in the same manner in both the left and right directions so that the apparatus can be constructed symmetrically in the left and right directions.

Further, because when the workpiece 201 starts its horizontal rotation, it enters the paint bath while commencing a rapid downward movement and it also moves in the bath while swinging, the downward movement and the rotation in the paint bath which have required two actions in the prior art, can be performed in one action at the same time. Therefore, the time required for this treatment is also shortened, whereby the total treatment time is shortened providing an increase in efficiency. Moreover, the apparatus is simple in structure and is easily maintained.

Further, the present invention can be modified and applied without limitation to each of the above-mentioned embodiments. The conveyance line which is an object of the invention is not limited to the electrodeposition painting line, but may be used with painting apparatus for spraying or the like. The object of the painting is not limited to the vehicle body, but may be any type of products.

What is claimed is:

1. An apparatus for a dipping treatment having a conveyor disposed above a treatment bath for dipping and designed to cause a workpiece conveyed by the conveyor to be immersed in and emerge from the treatment bath for dipping, wherein the workpiece is supported above the conveyor through a carrier, and the carrier is swung through an angle of approximately 180 degrees through the treatment bath for dipping in a plane that is substantially perpendicular to a direction of travel of the conveyor to cause the workpiece to be immersed in and emerge from the treatment bath for dipping.

2. The apparatus for the dipping treatment according to claim 1, wherein a part of the conveyor which is positioned above the treatment bath for dipping is provided with a movable section which rotates in the plane that is substantially perpendicular to the direction of travel, and this movable section is caused to rotate together with the carrier.

3. The apparatus for the dipping treatment according to claim 1, wherein the conveyor positioned above the treatment bath for dipping is positioned in one level plane.

4. The apparatus for the dipping treatment according to claim 1, wherein more than one treatment bath for dipping are disposed in series, and the dipping treatment is performed for each treatment bath for dipping in sequence.

5. The apparatus for the dipping treatment according to claim 1, wherein a tact conveyance method is employed on the workpiece, whereby the dipping treatment is performed after the carrier is stopped above the treatment bath for dipping.

6. A dipping treatment method for a workpiece being provided above a treatment bath for dipping, conveyed by a conveyor and immersed and emerge from the treatment bath, comprising the steps of:

supporting and moving a workpiece above the conveyor through a carrier;

stopping the carrier above a treatment bath; and swinging the carrier through an angle of approximately 180 degrees through the treatment bath for dipping in a plane that is substantially perpendicular to a direction of travel of the conveyor to cause the workpiece to be immersed and to emerge from the treatment bath for dipping.

7. An apparatus for treating and conveying different kinds of workpieces in a mixed condition to a treating section, wherein:

the apparatus is provided with a corresponding exclusive treating section having dipping baths on each side of a conveyor for each different kind of workpiece;

the workpiece on the conveyor can be horizontally rotated selectively, either to the right or left side in a direction of travel of the conveyor, corresponding to the treating section;

and the apparatus is constituted to treat each workpiece.

8. An apparatus for treating and conveying different kinds of workpieces in a mixed condition according to claim 7, wherein said treatment is a pretreatment process for the workpiece preceding a painting process in a painting line.

9. An apparatus for treating and conveying different kinds of workpieces in a mixed condition according to claim 7, wherein said treatment is a drying process for the workpiece subsequent to a painting process in a painting line.

10. An apparatus for treating and conveying different kinds of workpieces in a mixed condition according to claim 7, wherein said treating section comprises dipping baths, and the adjoining baths are arranged at different heights.

11. An apparatus according to claim 7, further including painting sections for applying different colors at both the left and right sides of the conveyor, and wherein the workpiece, which is guided and moved by said conveyor, is allowed to rotate horizontally either to the right or left side and is painted with a required color in any one of said painting sections.

12. An apparatus according to claim 11, wherein said painting is effected by electrodeposition, and each said painting section is a paint bath for dipping.

13. An apparatus for treating and conveying different kinds of workpieces in a mixed condition to a treating section, wherein said apparatus is provided with a corresponding exclusive treating section having dipping baths on each side of a conveyor for each different kind of workpiece, and the apparatus is adapted to allow the workpiece on the conveyor to be horizontally rotated through an angle of approximately 180 degrees selectively to the right or left side in a direction of travel corresponding to the treating conditions so as to treat the workpiece at either the right or left exclusive treating sections or to pass the workpiece without rotating horizontally when treating conditions are not suitable for either of the exclusive treating sections.

14. A dipping treatment method for different kinds of workpieces in a mixed condition, comprising the steps of:

supporting different kind of workpieces above a conveyor;

moving the workpieces on the conveyor to a treatment bath;

stopping a workpiece above the treatment bath; and rotating the workpiece on the conveyor through an angle of approximately 180 degrees selectively either to the right or left side substantially perpendicular to a direction of travel of the conveyor to treat each workpiece in accordance with the treating condition.

15. A method according to claim 14, including the following steps of:

moving the workpiece to painting sections;

stopping the carrier above the painting sections for applying different colors at both the left and right sides of the conveyor; and rotating the conveyor either to the right or the left side to paint the workpiece with a required color in any one of the painting sections.

* * * * *